US012616193B2

(12) United States Patent
Rosendal et al.

(10) Patent No.: US 12,616,193 B2
(45) Date of Patent: May 5, 2026

(54) 5-(1H-INDOL-3-YL)-OXAZOLE, -OXADIAZOLE AND -FURAN DERIVATIVES AS ENHANCERS OF SPERM MOTILITY

(71) Applicant: SPERMATECH AS, Oslo (NO)

(72) Inventors: Ken Roger Rosendal, Oslo (NO); Tuva Holt Hereng, Oslo (NO); Steffi Lundvall, Oslo (NO); Espen Marcelius Gjems, Oslo (NO); Håvard Hildeng Hauge, Oslo (NO); Bjørn Steen Skålhegg, Oslo (NO)

(73) Assignee: SPERMATECH AS, Oslo (NO)

( * ) Notice: Subject to any disclaimer, the term of this patent is extended or adjusted under 35 U.S.C. 154(b) by 790 days.

(21) Appl. No.: 17/922,405

(22) PCT Filed: Apr. 30, 2021

(86) PCT No.: PCT/GB2021/051049
§ 371 (c)(1),
(2) Date: Oct. 31, 2022

(87) PCT Pub. No.: WO2021/220012
PCT Pub. Date: Nov. 4, 2021

(65) Prior Publication Data

US 2023/0263155 A1 Aug. 24, 2023

(30) Foreign Application Priority Data

Apr. 30, 2020 (GB) .................................... 2006382

(51) Int. Cl.
*C07D 413/04* (2006.01)
*A01N 1/126* (2025.01)
(Continued)

(52) U.S. Cl.
CPC ............ *A01N 1/126* (2025.01); *A61D 19/02* (2013.01)

(58) Field of Classification Search
None
See application file for complete search history.

(56) References Cited

FOREIGN PATENT DOCUMENTS

| | | |
|---|---|---|
| CN | 102417501 A | 4/2012 |
| KR | 101 772 090 B1 | 8/2017 |

(Continued)

OTHER PUBLICATIONS

PubChem, N-(1,3-dioxaindan-5-yl)-2-{[5-(1H-indol-3-yl)-1,3,4-oxadiazol-2-yl]sulfanyl}acetamide, CID 2347984, Jul. 15, 2005 (Year: 2005).*

PubChem, AlphaScreen-based biochemical high throughput primary assay to identify activators of the E3 ligase (FBW7), AID 1259310, Apr. 17, 2017 (Year: 2017).*

International search report and written opinion in PCT/GB2021/051049. Mailed Jul. 30, 2021. 7 pages.

Search Report for GB2006382.2. Mailed Oct. 8, 2020. 4 pages.

(Continued)

*Primary Examiner* — Kortney L. Klinkel
*Assistant Examiner* — Alison Azar Salamatian
(74) *Attorney, Agent, or Firm* — Meunier Carlin & Curfman LLC

(57) ABSTRACT

The invention relates to the use of compounds of formula (I), stereoisomers, and physiologicaily tolerable salts thereof, to enhance the motility of sperm obtained from a non-human mammal: wherein in formula I: X is —NR'— (in which R' is H or $C_{1-3}$ alkyl. e.g. —$CH_3$), —O—, —S— or —$CH_2$—; Y is —S—, —O—, —NR"— (in which R" is H or $C_{1-3}$ alkyl, e.g. —$CH_3$), or —$CH_2$—; $Z^1$ and $Z^2$ are independently selected from N and CH; R1 to R3 are independently selected from hydrogen, halogen, $C_{1-6}$ alkyl, $C_{1-6}$ alkoxy, $C_{1-6}$ haloalkyl, —OH, —CN, —$NO_2$ and —$NR^{12}R^{13}$; $R^4$ is hydrogen, halogen, $C_{1-6}$ alkyl, $C_{1-6}$ alkoxy, $C_{1-6}$ haloalkyl, or —OH; $R^5$ is hydrogen, halogen, $C_{1-6}$ alkyl, $C_{1-6}$ alkoxy, or $C_{1-6}$ haloalkyl; $R^6$ and $R^7$ are independently selected from hydrogen, halogen, $C_{1-6}$ alkyl, $C_{1-6}$ alkoxy, $C_{1-6}$ haloalkyl, —OH, —CN, —$NO_2$ and —$NR^{12}R^{13}$; $R^8$ is hydrogen, halogen, $C_{1-6}$ alkyl, $C_{1-6}$ alkoxy, $C_{1-6}$ haloalkyl, —CN, —$NO_2$ or —$NR^{12}R^{13}$; $R^9$ is hydrogen or $C_{1-4}$ alkyl; $R^{10}$ and $R^{11}$ are independently selected from hydrogen and $C_{1-3}$ alkyl; or $R^{10}$ and $R^{11}$, together with the intervening —O— and ring atoms, are joined to form a dioxolane ring; and $R^{12}$ and $R^{13}$ are independently selected from H and $C_{1-3}$ alkyl. The compounds find particular use in animal husbandry to increase the rate of fertilization in artificial insemination of livestock, especially pigs. They can also be used to prepare, pre-treat or store semen for use in artificial insemination procedures.

(I)

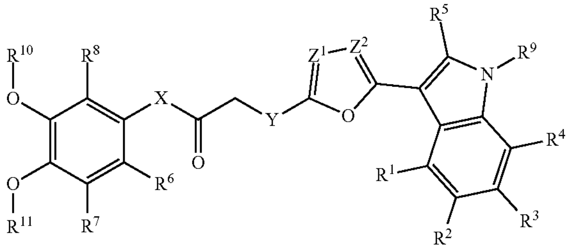

24 Claims, 4 Drawing Sheets

Figure 1A:
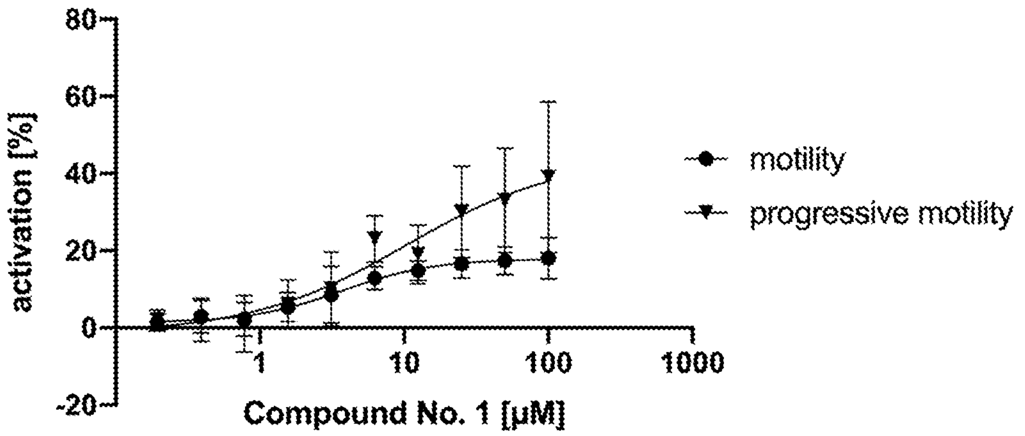

(51) Int. Cl.

| | |
|---|---|
| ***A61D 19/02*** | (2006.01) |
| ***C07D 413/14*** | (2006.01) |
| *A61K 31/4245* | (2006.01) |

(56) References Cited

FOREIGN PATENT DOCUMENTS

| | | | |
|---|---|---|---|
| WO | 01/07021 | A1 | 7/2000 |
| WO | 2004006916 | A1 | 1/2004 |

OTHER PUBLICATIONS

Chemcats, CAS Registry Nos. 950095-43-9, 939183-75-2, 565444-49-7. Refer to CAS database for details of compounds. Records included for basic reference.

* cited by examiner

5-(1H-INDOL-3-YL)-OXAZOLE, -OXADIAZOLE AND -FURAN DERIVATIVES AS ENHANCERS OF SPERM MOTILITY

FIELD OF THE INVENTION

The present invention relates to the use of compounds to enhance sperm motility. It finds particular application in animal husbandry to increase the rate of fertilization in artificial insemination of livestock, especially pigs. The invention can also be used to prepare, pre-treat or store semen for use in artificial insemination procedures.

BACKGROUND OF THE INVENTION

Due to its low price and high nutritional content, pork is the most widely consumed meat worldwide and its production rate is increasing in order to meet the continuously increasing demand.

The worldwide production of meat for human consumption, especially pork and beef, is reliant on methods of artificial insemination to produce sufficient livestock to meet consumer demand. Natural breeding requires more male animals and is labor intensive for farmers. However, artificial breeding in which female animals are artificially inseminated requires fewer males, has higher success rates, is more time-efficient, and reduces the costs to the farmer. Artificial insemination also allows for selective breeding which may be used when rearing livestock animals, or in the breeding of high value animals (e.g. race horses) or endangered species, for example.

Artificial insemination is commonly practiced in the breeding of livestock, especially pigs and cattle, and often requires the storage of collected semen in liquid nitrogen, i.e. cryopreservation, prior to use. Cryopreservation of semen is widely used in the beef industry, but is less common in the pork industry as semen from pigs (i.e. boar) can be more temperature-sensitive than bull sperm. The temperature sensitivity of boar sperm may be due to a lower cholesterol to phospholipid ratio as compared to stallion, bull or ram semen, for example. A higher cholesterol content leads to a reduced susceptibility to decreased temperatures. Cryopreservation of boar sperm can change its protein profile. This can lead to the loss of sperm surface proteins and inactivation of membrane-bound enzymes which may result in decreased sperm cell viability and motility. Cryopreservation may also lead to early onset of the acrosome reaction which occurs in the acrosome of the sperm as it approaches the egg and which is essential for fertilization to occur. Furthermore, cryopreservation of boar sperm prior to fertilization may lead to sperm cell apoptosis, DNA fragmentation and the production of reactive oxygen species. Following cryopreservation, boar sperm has only 40-70% of the fertility rate of fresh sperm.

Despite these problems, cryopreservation must still be used when transporting boar sperm or when it is necessary for it to be stored for any prolonged period. Storage may be required, for example, to keep the genetic variation as well as valuable genes. Moreover, porcine fertility is dependent on the month of the year. During warm months, pigs produce less offspring and boar sperm collected during these months is more prone to be affected by freezing. These fluctuations during the year lead to economic losses for the pork industry. To reduce this economic burden, and increase the quality of life for pigs, other preservation methods for boar sperm which do not affect the sperm quality (sperm count, motility and viability) are needed.

To be able to store boar semen for a few days, extenders are added to the semen samples. Extenders contain buffers and nutrients which prolong the half-life of the semen, but they do not improve the sperm cell's motility as compared to freshly collected semen.

One strategy to increase fertilization and litter size is to increase the motility of sperm cells. Holt et al. (J Androl 1997, 18:312-323) showed a clear correlation between sperm motility and results of on-farm inseminations in boars. If the sperm cells have a higher motility, they will have a higher chance of travelling up the female reproductive tract and reaching the eggs. Sperm motility has different modes: hyperactivation, progressive motility and standard motility. All three parameters are important in the fertilization process.

The invention seeks to address at least some of these problems in the art and, in particular, to provide compounds that are capable of enhancing sperm motility, function and/or activity. More specifically, it seeks to provide compounds which can be used to enhance the conception rate and/or litter size in artificial insemination of non-human mammals (e.g. livestock).

SUMMARY OF THE INVENTION

The inventors have now surprisingly found certain compounds that function as "sperm activators". When added to fresh boar semen or boar semen samples which have been stored at a reduced temperature for several days, these have been found to enhance sperm motility. The addition of such "activators" has also been found to result in higher fertility and offspring rates in artificial insemination of pigs.

The "activator" compounds disclosed herein are particularly suitable for use in the breeding and raising of pigs in the pork industry. However, the inventors' findings can be expected to extend to the treatment of sperm from other livestock and other non-human mammals. Accordingly, the compounds may also find use in other meat production industries such as in rearing cattle, and in the breeding of high value animals such as horses. Although stallion and bull sperm can be cryopreserved with higher fertility rates than boar semen, increasing the success rate of artificial insemination by the addition of "activators" will also greatly benefit these industries, not least since stallion and bull sperm doses are very expensive.

Use of the "activator" compounds as herein described to treat the sperm of endangered mammals, e.g. following cryopreservation, can also increase the chances of successful reproduction in artificial insemination. Where long term storage of semen is possible, the artificial insemination procedure may even be carried out following death of the donor male.

DETAILED DESCRIPTION OF THE INVENTION

In one aspect the invention provides the use of a compound of formula (I), a stereoisomer, or a physiologically tolerable salt thereof, to enhance the motility of sperm obtained from a non-human mammal:

(I)

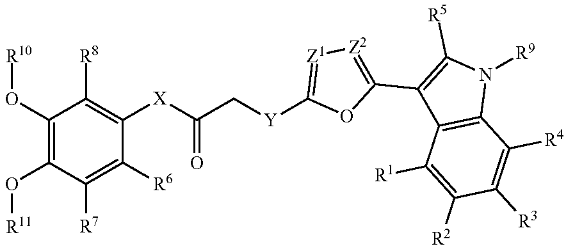

wherein:

X is —NR'— (in which R' is H or $C_{1-3}$ alkyl, e.g. —$CH_3$), —O—, —S— or —$CH_2$—;

Y is —S—, —O—, —NR"— (in which R" is H or $C_{1-3}$ alkyl, e.g. —$CH_3$), or —$CH_2$—;

$Z^1$ and $Z^2$ are independently selected from N and CH;

$R^1$ to $R^3$ are independently selected from hydrogen, halogen, $C_{1-6}$ alkyl, $C_{1-6}$ alkoxy, $C_{1-6}$ haloalkyl, —OH, —CN, —$NO_2$ and —$NR^{12}R^{13}$.

$R^4$ is hydrogen, halogen, $C_{1-6}$ alkyl, $C_{1-6}$ alkoxy, $C_{1-6}$ haloalkyl, or —OH;

$R^5$ is hydrogen, halogen, $C_{1-6}$ alkyl, $C_{1-6}$ alkoxy, and $C_{1-6}$ haloalkyl;

$R^6$ and $R^7$ are independently selected from hydrogen, halogen, $C_{1-6}$ alkyl, $C_{1-6}$ alkoxy, $C_{1-6}$ haloalkyl, —OH, —CN, —$NO_2$ and —$NR^{12}R^{13}$;

$R^8$ is hydrogen, halogen, $C_{1-6}$ alkyl, $C_{1-6}$ alkoxy, $C_{1-6}$ haloalkyl, —CN, —$NO_2$ or —$NR^{12}R^{13}$;

$R^9$ is hydrogen or $C_{1-4}$ alkyl.

$R^{10}$ and $R^{11}$ are independently selected from hydrogen and $C_{1-3}$ alkyl;

or $R^{10}$ and $R^{11}$, together with the intervening —O— and ring atoms, are joined to form a dioxolane ring; and $R^{12}$ and $R^{13}$ are independently selected from H and $C_{1-3}$ alkyl;

The term "alkyl" as used herein refers to a monovalent saturated, linear or branched, carbon chain. Examples of alkyl groups include, but are not limited to, methyl, ethyl, n-propyl, iso-propyl, n-butyl, iso-butyl, sec-butyl, tert-butyl, n-pentyl, iso-pentyl, neo-pentyl, and n-hexyl. An alkyl group preferably contains from 1-6 carbon atoms, more preferably 1-4 carbon atoms, e.g. 1-3 carbon atoms.

The term "halogen" refers to —F, —Cl, —Br or —I. Preferred examples of such groups are —F, —Cl, and —Br.

The term "haloalkyl" refers to an alkyl group as defined herein in which at least one of the hydrogen atoms of the alkyl group is replaced by a halogen atom, preferably —F, —Cl or —Br. Examples of such groups include —$CH_2F$, —$CHF_2$, —$CF_3$, —$CCl_3$, —$CHCl_2$ and —$CH_2CF_3$.

In one embodiment of formula (I), X is —NR'— (in which R' is H or $C_{1-3}$ alkyl, e.g. —$CH_3$), —O— or —$CH_2$—. Preferably X is —NR'— (in which R' is H or —$CH_3$) or —O—. More preferably X is —NH— or —O—. Yet more preferably, X is —NH—.

In one embodiment of formula (I), Y is —S—, —O—, —NR"— (in which R" is H or —$CH_3$), or —$CH_2$—. Preferably, Y is —S—.

In one embodiment of formula (I), X and Y may not both be —$CH_2$—. In one embodiment, X is —NR'— (in which R' is as herein defined) and Y is —S—.

In one embodiment, the compounds for use in the invention are those of formula (II), their stereoisomers and physiologically tolerable salts thereof:

(II)

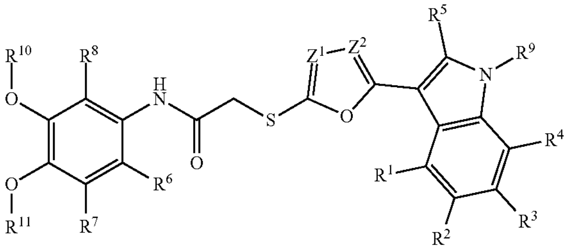

(wherein $Z^1$, $Z^2$, and $R^1$ to $R^{11}$ are as herein defined).

In one embodiment of formula (I), both $Z^1$ and $Z^2$ are N, or one of $Z^1$ and $Z^2$ is N and the other of $Z^1$ and $Z^2$ is CH. In one embodiment, $Z^1$ and $Z^2$ are not both CH. Preferably, both $Z^1$ and $Z^2$ are N.

In one embodiment, the compounds for use in the invention are those of formula (III), their stereoisomers and physiologically tolerable salts thereof:

(III)

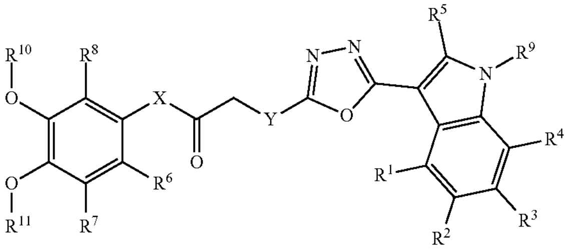

(wherein X, Y and $R^1$ to $R^{11}$ are as herein defined).

In one embodiment of formula (I), (II) and (III), $R^1$ to $R^3$ are independently selected from hydrogen, halogen (e.g. —F, —Cl or —Br), $C_{1-4}$ alkyl, and $C_{1-4}$ haloalkyl (e.g. —$CF_3$).

In one embodiment of formula (I), (II) and (III), $R^4$ is hydrogen, halogen (e.g. —F, —Cl or —Br), $C_{1-4}$ alkyl, or $C_{1-4}$ haloalkyl (e.g. —$CF_3$).

In one embodiment of formula (I), (II) and (III), $R^5$ is hydrogen, halogen (e.g. —Cl or —Br), $C_{1-4}$ alkyl, or $C_{1-4}$ haloalkyl (e.g. —$CF_3$);

In one embodiment of formula (I), (II) and (III), $R^6$ and $R^7$ are independently selected from hydrogen, halogen (e.g. —F, —Cl or —Br), $C_{1-4}$ alkyl, and $C_{1-4}$ haloalkyl (e.g. —$CF_3$);

In one embodiment of formula (I), (II) and (III), $R^8$ is hydrogen, halogen (e.g. —F, —Cl or —Br), $C_{1-4}$ alkyl, or $C_{1-4}$ haloalkyl (e.g. —$CF_3$).

In one embodiment of formula (I), (II) and (III), $R^9$ is hydrogen or —$CH_3$. Preferably $R^9$ is hydrogen.

In one embodiment of the compounds of formula (I), (II) and (III), $R^{10}$ and $R^{11}$ are independently selected from hydrogen and —$CH_3$. In another embodiment, $R^{10}$ and $R^{11}$, together with the intervening —O— and ring atoms, are joined to form a dioxolane ring.

In one embodiment, the compounds for use in the invention are those of formula (IV), their stereoisomers and physiologically tolerable salts thereof:

(IV)

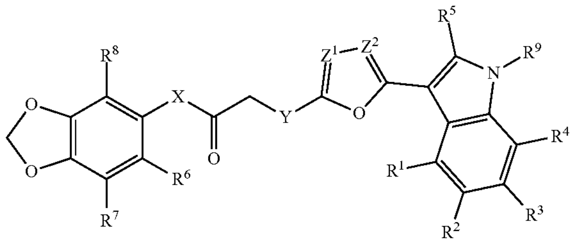

(wherein $Z^1$, $Z^2$, X, Y and $R^1$ to $R^9$ are as herein defined).

In one embodiment of the compounds of formula (I), (II), (III) and (IV), only one of $R^1$ to $R^4$ is other than hydrogen. In another embodiment of the compounds of formula (I), (II), (III) and (IV), only one of $R^1$ to $R^5$ is other than hydrogen.

In one embodiment of the compounds of formula (I), (II), (III) and (IV), only one of $R^6$ to $R^8$ is other than hydrogen.

In one embodiment of the compounds of formula (I), (II), (III) and (IV), $R^1$ to $R^8$ are independently selected from hydrogen, $-Cl$, $-CF_3$ and $-CH_3$.

In one embodiment of the compounds of formula (I), (II), (III) and (IV), each of $R^1$ to $R^8$ is hydrogen.

Examples of compounds for use in the invention include, but are not limited to, the following compound, its stereoisomers, and any physiologically tolerable salts:

Compound No. 1

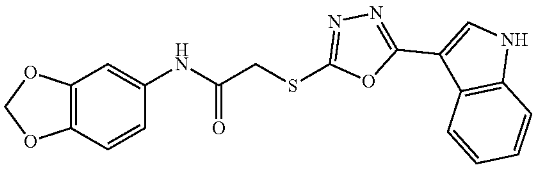 [SMILES: O=C(CSc1nnc(-c2c[nH]c3ccccc23)o1)Nc1ccc2c(c1)OCO2]

Certain compounds described herein are novel and these form a further aspect of the invention.

Thus, in a further aspect, the present invention provides a compound of general formula (I), or a stereoisomer or physiologically tolerable salt thereof, wherein said compound is other than:

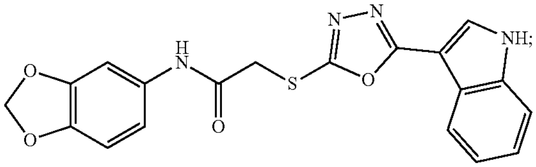

;

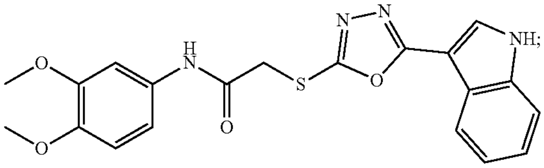

; or

-continued

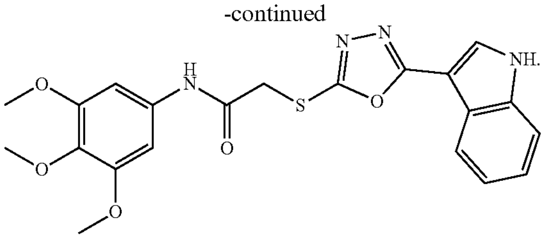

.

Any of the compounds herein described may be employed in the form of a physiologically tolerable salt. By "physiologically tolerable" is meant any component which is suitable for administration to an animal body, in particular which is suitable for intravaginal administration. The term "physiologically tolerable salt" refers to any physiologically tolerable organic or inorganic salt of any of the compounds herein described. Such a salt may include one or more additional molecules such as counter-ions. The counter-ions may be any organic or inorganic group which stabilizes the charge on the parent compound. If the compound for use in the invention is a base, a suitable pharmaceutically acceptable salt may be prepared by reaction of the free base with an organic or inorganic acid. If the compound for use in the invention is an acid, a suitable pharmaceutically acceptable salt may be prepared by reaction of the free acid with an organic or inorganic base.

Any of the compounds herein described may be converted into a salt thereof, particularly into a physiologically tolerable salt thereof with an inorganic or organic acid or base. Procedures for salt formation are conventional in the art.

A suitable physiologically tolerable salt of a compound herein described is, for example, an acid addition salt of a compound which is sufficiently basic, for example, an acid addition salt with, for example, an inorganic or organic acid. Acids which may be used for this purpose include hydrochloric acid, hydrobromic acid, nitric acid, sulphuric acid, sulphonic acid, methanesulphonic acid, phosphoric acid, fumaric acid, succinic acid, lactic acid, citric acid, tartaric acid, malic acid, malonic acid, maleic acid, acetic acid, trifluoroacetic acid and ascorbic acid, para-toluene sulphonic acid, 2-mesitylene sulphonic acid, 1,2-ethanedisulphonic, adipic, aspartic, benzenesulphonic, benzoic, ethanesulphonic or nicotinic acid.

In addition, a suitable physiologically tolerable salt of a compound herein described, is, for example, a base addition salt of a compound which is sufficiently acidic, for example, a metal salt, for example, a sodium, potassium, calcium, magnesium, zinc or aluminium salt, an ammonium salt, or a salt with an organic base which affords a physiologically acceptable cation, which includes quarternary ammonium hydroxides, for example methylamine, ethylamine, diethylamine, trimethylamine, tert-butylamine, triethylamine, dibenzylamine, N,N-dibenzylethylamine, cyclohexylethylamine, tris-(2-hydroxyethyl)amine, hydroxyethyl diethylamine, (IR, 2S)-2-hydroxyinden-I-amine, morpholine, N-methylpiperidine, N-ethylpiperidine, piperazine, methylpiperazine, adamantylamine, choline hydroxide, tetrabutylammonium hydroxide, tris-(hydroxymethyl)methylamine hydroxide, L-arginine, N-methyl D-glucamine, lysine or arginine, and organic amines such as diethylamine, triethylamine, ethanolamine, diethanolamine, cyclohexylamine and dicyclohexylamine.

As will be understood, certain compounds herein described may contain one or more stereocenters and may therefore exist in different stereoisomeric forms. The term "stereoisomer" refers to compounds which have identical chemical constitution but which differ in respect of the spatial arrangement of the atoms or groups. Examples of stereoisomers are enantiomers and diastereomers. The term "enantiomers" refers to two stereoisomers of a compound which are non-superimposable mirror images of one another. The term "diastereoisomers" refers to stereoisomers with two or more stereocenters which are not mirror images of one another. The invention is considered to extend to the use of diastereomers and enantiomers, as well as racemic mixtures and enantioenriched mixtures in which the ratio of the enantiomers is other than 1:1.

The compounds herein described may be resolved into their enantiomers and/or diastereomers. For example, where these contain only one chiral centre, these may be provided in the form of a racemate or racemic mixture (a 50:50 mixture of enantiomers) or may be provided as pure enantiomers, i.e. in the R- or S-form. Any of the compounds which occur as racemates may be separated into their enantiomers by methods known in the art, such as column separation on chiral phases or by recrystallization from an optically active solvent. Those compounds with at least two asymmetric carbon atoms may be resolved into their diastereomers on the basis of their physical-chemical differences using methods known per se, e.g. by chromatography and/or fractional crystallization, and where these compounds are obtained in racemic form, they may subsequently be resolved into their enantiomers.

The compounds herein disclosed are either known in the art, or can be prepared by methods known to those skilled in the art. Some of the compounds are commercially available from sources including Enamine. For example, Compound No. 1 as herein described is available from Enamine under the catalogue number Z19304321.

Any of the compounds herein described which are not known in the art may be prepared from readily available starting materials using synthetic methods known in the art such as those described in known textbooks, for example, in Advanced Organic Chemistry (March, Wiley Interscience, 5$^{th}$ Ed. 2001) or Advanced Organic Chemistry (Carey and Sundberg, KA/PP, 4$^{th}$ Ed. 2001).

The following reaction schemes show general methods for preparing the compounds of formula (I) and key intermediates. The compounds used as starting materials are either known from the literature or may be commercially available. Alternatively, these may readily be obtained by methods known from the literature. As will be understood, other synthetic routes may be used to prepare the compounds using different starting materials, different reagents and/or different reaction conditions.

Scheme 1

(a)

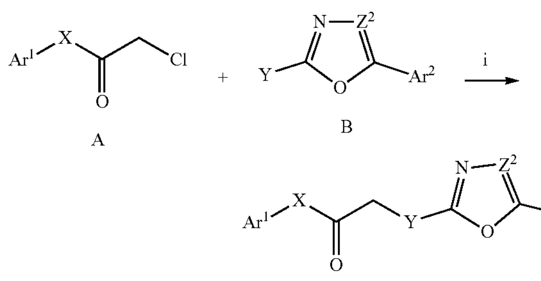

-continued

X = NH, O or $CH_2$
Y = S, O or NH
$Z^2$ = N or CH (b)

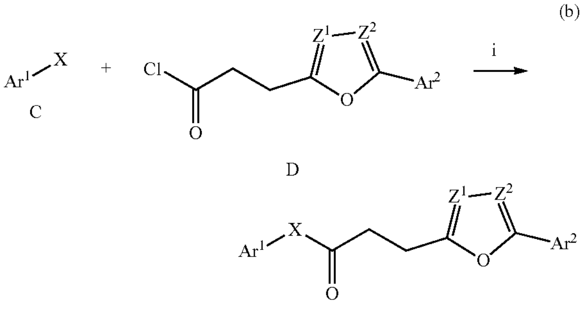

X = NH or O
$Z^1$ = N or CH
$Z^2$ = N or CH (c)

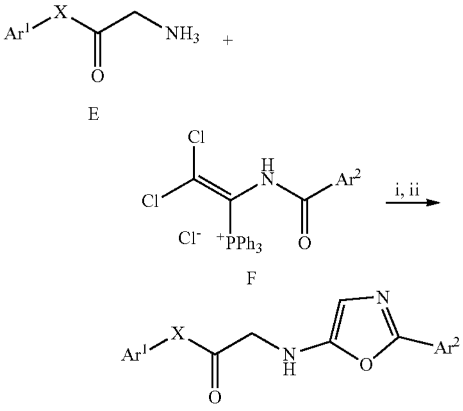

X = NH, O or $CH_2$ (d)

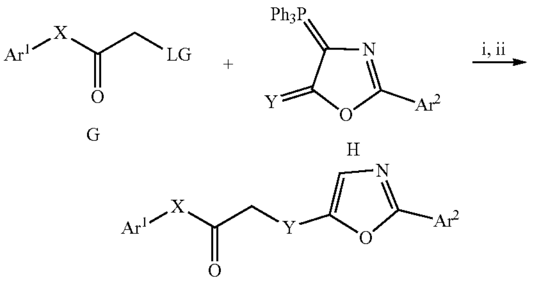

X = NH, O or $CH_2$
Y = S or O
LG = I or OTf wherein $Ar^1$ is 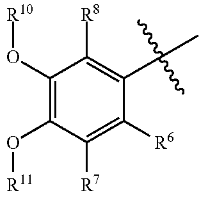 $Ar^2$ is 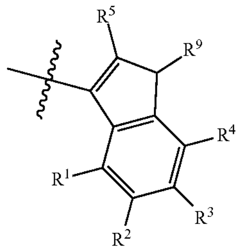

LG = leaving group
$R^1$-$R^{10}$ are as herein defined

Scheme 1 shows general methods for the preparation of compounds for use in the invention, in which: (a)(i) $K_2CO_3$, acetone, reflux; (b)(i) toluene, reflux; (c)(i) MeOH, aq. NaI; (c)(ii) NaOH, $H_2O$, heat; (d)(i) DCM or MeOH, r.t.; (d)(ii) NaOH, $H_2O$, heat.

The starting materials for use in Scheme 1 can be prepared from readily available starting materials and/or according to the methods in Scheme 2:

Scheme 2

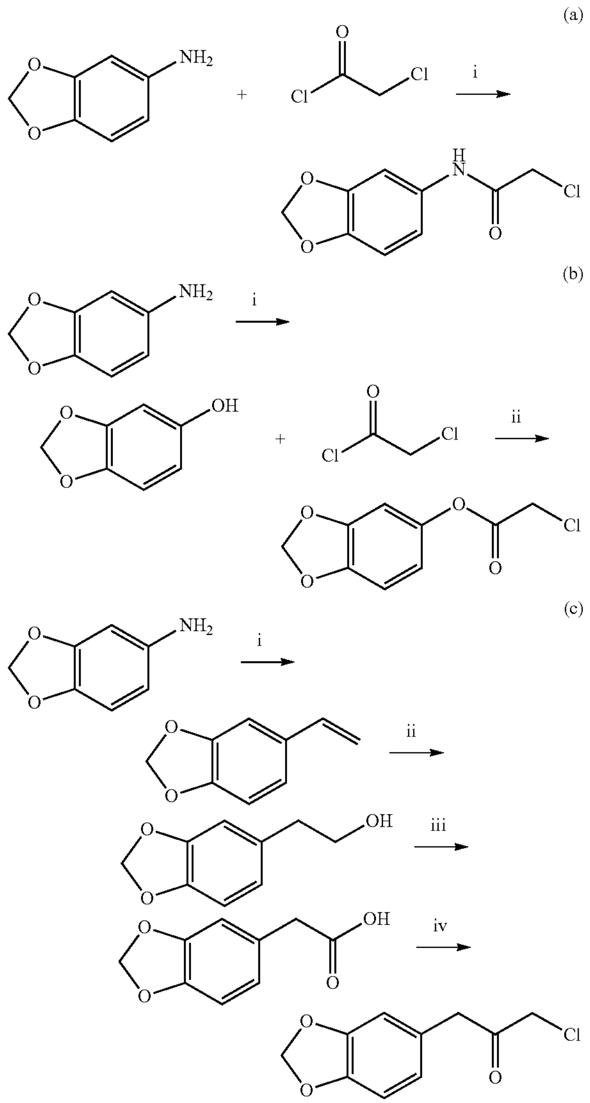

Scheme 2 shows general methods for the construction of fragment A, in which: (a)(i) $NEt_3$, DCM, r.t. (US2019/0031655); (b)(i) $NaNO_2$, $HBF_4$, $H_2O$, 0° C., then $CuSO_4$, $Cu_2O$, r.t.; (ii) pyridine, DCM; (c)(i) $NaNO_2$, $HBF_4$, $H_2O$, 0° C., then $K((CH{=}CH_2)(BF_3))$, $Pd_2(\mu\text{-}OAc)_2(P(o\text{-}Tol)_3)_2$, MeOH, r.t.; (c)(ii) 9-BBN, THF, r.t., then $H_2O_2$, NaOH, EtOH; (c)(iii) TEMPO, NaOCl, $NaClO_2$, MeCN, r.t.; (c)(iv) iPrMgCl, THF, TBME, −10° C. to r.t., then 2-chloro-N-methoxy-N-methylacetamide, 0° C. (J. Org. Chem. 2014, 79: 8917-8925). 6-Amino-3,4-benzodioxane and 3,4-dimethoxyaniline are also commercially available; variants of these compounds and benzo[1,3]dioxolo-5-ylamine where one aromatic H has been substituted are either commercially available, or otherwise can be prepared according to the methods shown herein.

Scheme 3

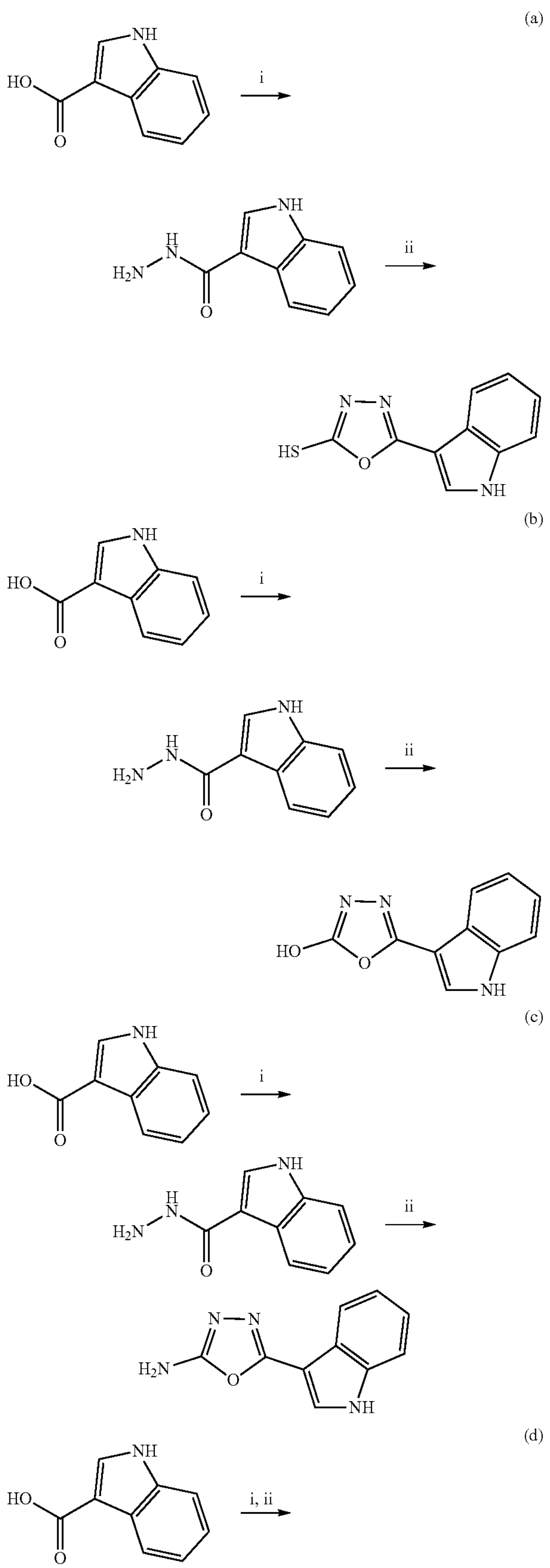

-continued

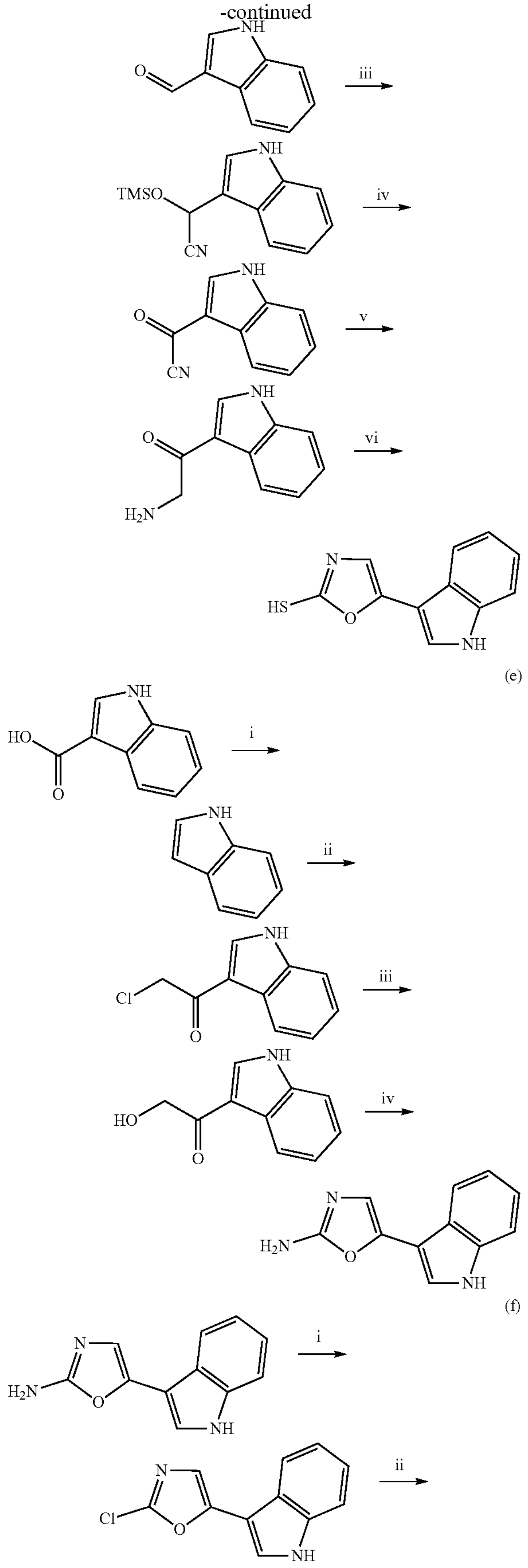

-continued

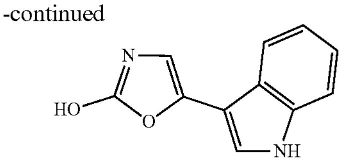

Scheme 3 shows general methods for the construction of fragment B, in which: (a)(i) $SOCl_2$, r.t., then $NH_2NH_2 \cdot H_2O$, THF, 0° C. (WO 2008/118745) (a)(ii) $CS_2$, KOH, EtOH, reflux (Chem. Pap. 2019, 73:17-25); (b)(i) $SOCl_2$, r.t., then $NH_2NH_2 \cdot H_2O$, THF, 0° C. (WO 2008/118745); (b)(ii) triphosgene, DIPEA, DCM, r.t.; (c)(i) $SOCl_2$, r.t., then $NH_2NH_2 \cdot H_2O$, THF, 0° C. (WO 2008/118745); (c)(ii) BrCN, MeOH, reflux; (d)(i) $LiAlH_4$, THF, 0° C. to r.t. (J. Med. Chem. 2013, 56, 3725-3732); (d)(ii) $MnO_2$, MeCN, r.t. (Tetrahedron 2002, 58, 2813-2819); (d)(iii) TMSCN, MeCN, reflux (Tetrahedron 2002, 58:2813-2819); (d)(iv) DDQ, 1,4-dioxane (Tetrahedron 2018, 74:217-223); (v) Pd/C, $H_2$, $H_3CCOOH$, r.t. (Tetrahedron Lett. 2009, 50:4343-4345); (d) (vi) $CS_2$, $Na_2CO_3$, EtOH, reflux; (e)(i) [Rh(OH)(cod)]$_2$, DPPP, NaOH, $H_2O$, PhMe, 100° C. (Org. Lett. 2010, 12:992-995); (e)(ii) $ClH_2CCOCl$, 1,4-dioxane, heat (.J. Heterocycl. Chem. 2007, 44:109-114); (e)(iii) $H_2O$, $N_2NCHO$, 110° C. (J. Org. Chem. 1988, 53:5446-5453); (e)(iv) $H_2NCN$, EtOH, reflux; (f)(i) tBuONO, $CuCl_2$, heat; (f)(ii) $H_2O$, LiOH, THF. Variants of 1H-indole-3-carboxylic acid where one aromatic H has been substituted are either commercially available, or otherwise can be prepared according to the methods shown herein. Alkylation of the indole N can be achieved according to the method in Scheme 12.

Scheme 4

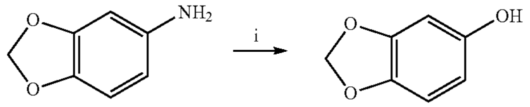

Scheme 4 shows a general method for the construction of fragment C (if the corresponding phenol is not commercially available), in which: (i) $NaNO_2$, $HBF_4$, $H_2O$, 0° C., then $CuSO_4$, $Cu_2O$, r.t. 6-amino-3,4-benzodioxane and 3,4-dimethoxyaniline are also commercially available. Variants of these compounds and benzo[1,3]dioxolo-5-ylamine where one aromatic H has been substituted are either commercially available, or otherwise can be prepared according to the methods shown herein.

Scheme 5

(a)

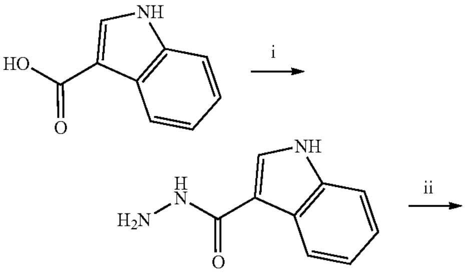

-continued

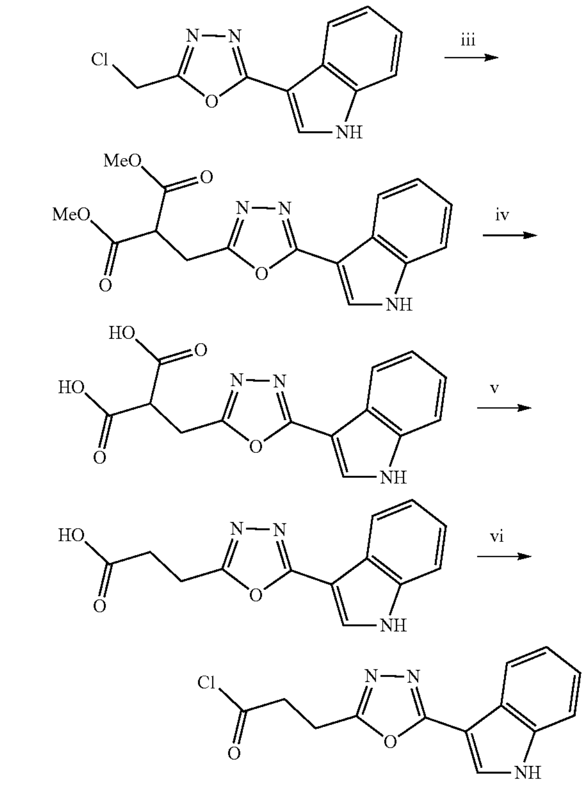

(b)

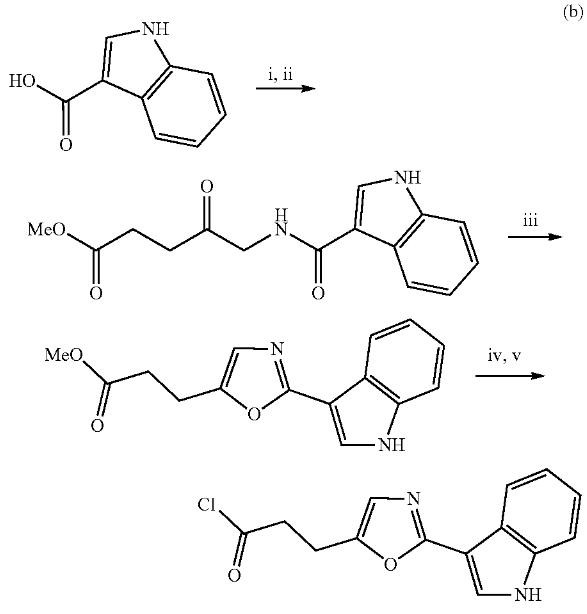

(c)

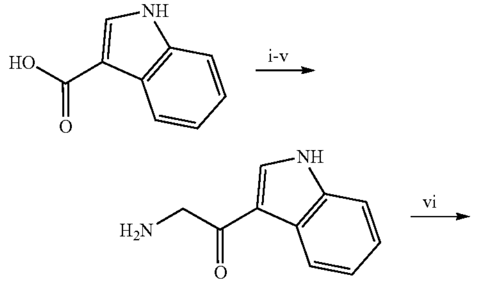

-continued

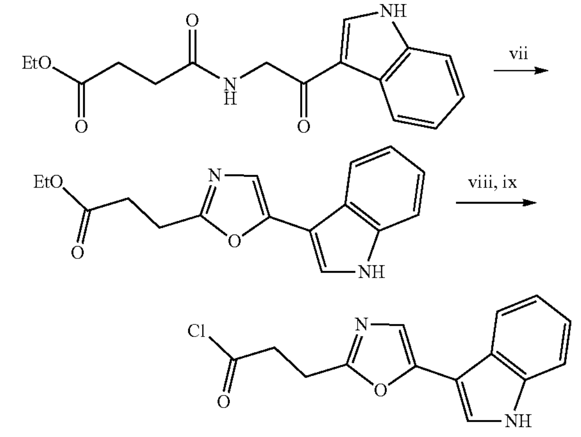

Scheme 5 shows general methods for the construction of fragment D, in which: (a)(i) $SOCl_2$, r.t., then $NH_2NH_2{\cdot}H_2O$, THF, 0° C. (WO 2008/118745); (a)(ii) $ClCH_2COOH$, $POCl_3$, 80° C. (Eur. J. Med. Chem. 2013, 63, 22-32); (a)(iii) $H_2C(CO_2Me)_2$, NaH, THF, 0° C., then 1H-indole-3-carboxylic acid hydrazide, NaI, r.t.; (a)(iv) LiOH, THF/MeOH/$H_2O$, r.t.; (a)(v) DMF, heat; (a)(vi) $SOCl_2$, toluene, reflux; (b)(i) $SOCl_2$, r.t.; (b)(ii) 5-aminolevulinic acid methyl ester, $NEt_3$, DCM, (b)(iii) Burgess reagent, $NEt_3$, MeCN, reflux; (b)(iv) LiOH, THF/MeOH/$H_2O$, r.t.; (b)(v) $SOCl_2$, toluene, reflux; (c)(i-v) see Scheme 3d; (c)(vi) ethyl 4-chloro-4-oxobutyrate, pyridine, r.t.; (c)(vii) $P_2O_5$, $CHCl_3$, heat; (c)(viii) LiOH, THF/MeOH/$H_2O$, r.t.; (c)(ix) $SOCl_2$, toluene, reflux. Variants of 1H-indole-3-carboxylic acid where one aromatic H has been substituted are either commercially available, or otherwise can be prepared according to the methods shown herein. Alkylation of the indole N can be achieved according to the method in Scheme 12.

Scheme 6

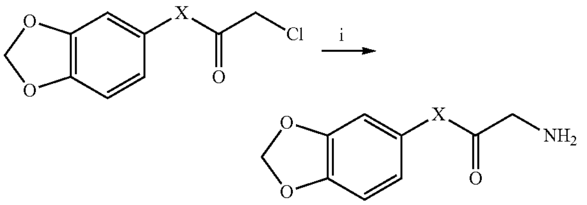

Scheme 6 shows a general method for the construction of fragment E (all fragment A compounds can be used as starting materials), in which: (i) $NH_3$, EtOH, heat. Variants of these compounds where one aromatic H has been substituted are either commercially available, or otherwise can be prepared according to the methods shown herein.

Scheme 7

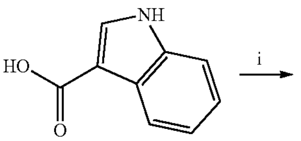

-continued

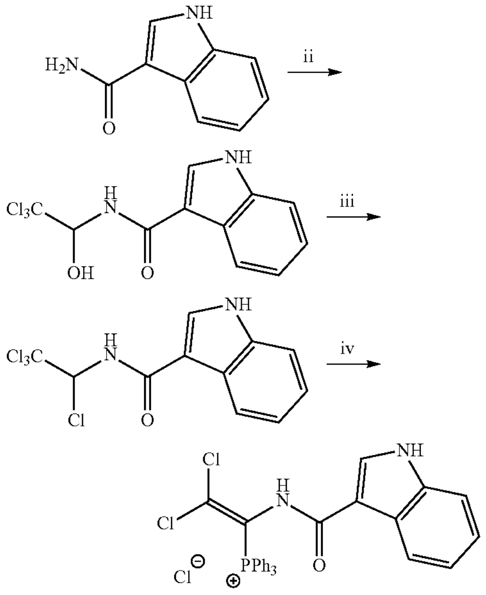

Scheme 7 shows a general method for the construction of fragment F, in which: (i) $NH_3$, CDI, DMF, r.t. (Chim. Acta 1994, 77, 1886-1894); (ii) $Cl_3CCHO$, PhMe, heat; (iii) $PCl_5$, $Et_2O$; (iv) $PPh_3$, PhH, heat. Variants of these compounds where one aromatic H has been substituted are either commercially available, or otherwise can be prepared according to the methods shown herein.

Scheme 8

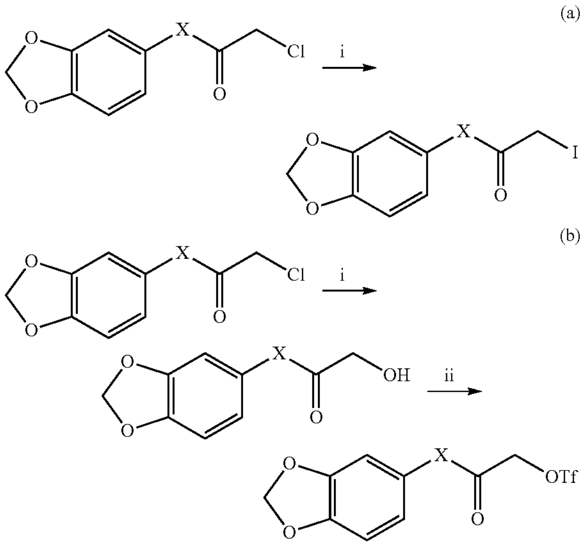

Scheme 8 shows a general method for the construction of fragment G (all fragment A compounds can be used as starting materials), in which: (a)(i) KI, acetone, reflux; (b)(i) $Na_2CO_3$, $H_2O$, NMP, heat; (b)(ii) $Tf_2O$, 2,6-dimethylpyridine, DCM, −78° C. (variants of these compounds where one aromatic H has been substituted are either commercially available, or otherwise can be prepared according to the methods shown herein).

Scheme 9

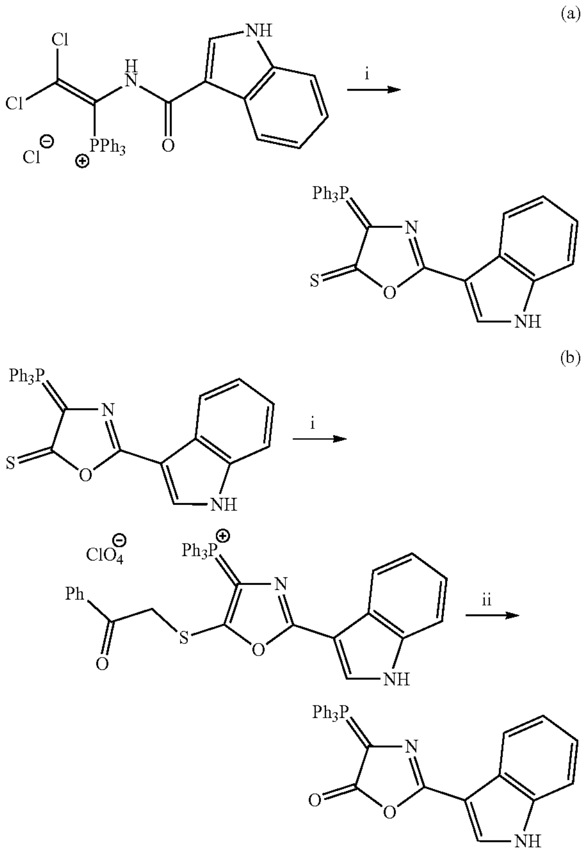

Scheme 9 shows a general method for the construction of fragment H, in which: (a)(i) $Na_2S$, MeOH, r.t.; (b)(i) $PhCOCH_2Br$, DCM, r.t.; (b)(ii) NaOMe, MeOH, r.t. (variants of these compounds where one aromatic H has been substituted are either commercially available, or otherwise can be prepared according to the methods shown herein).

Scheme 10

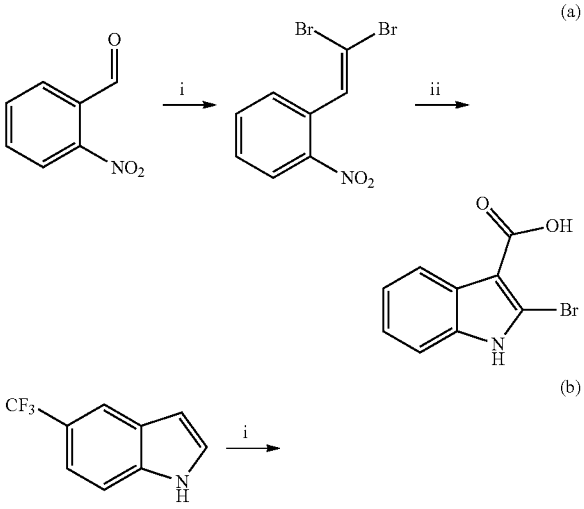

-continued

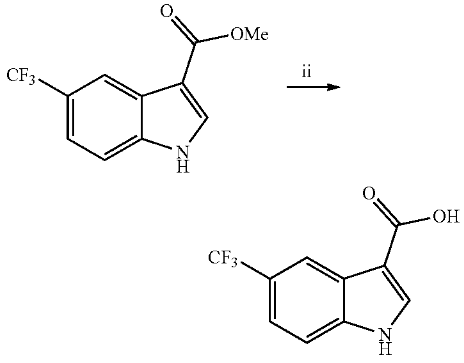

(c)

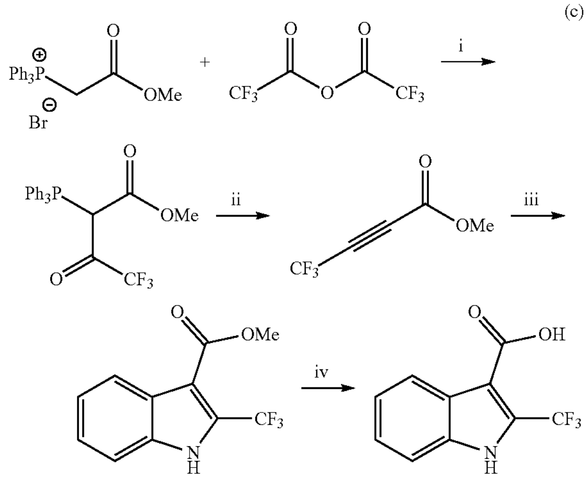

(d)

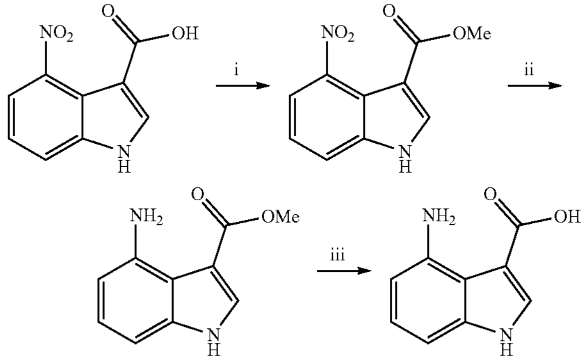

(e)

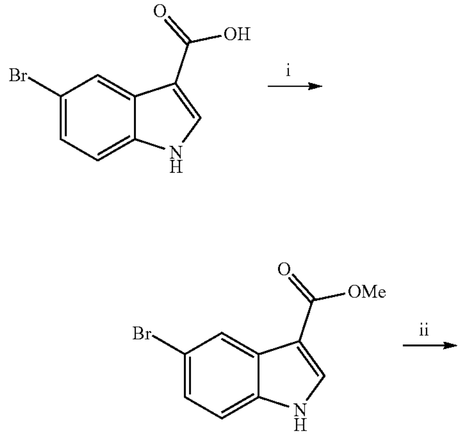

-continued

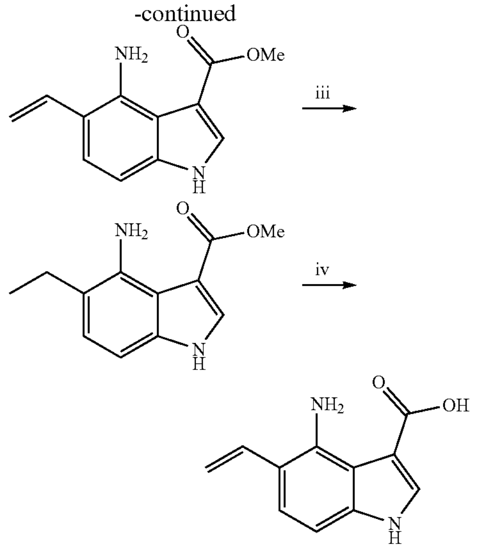

(f)

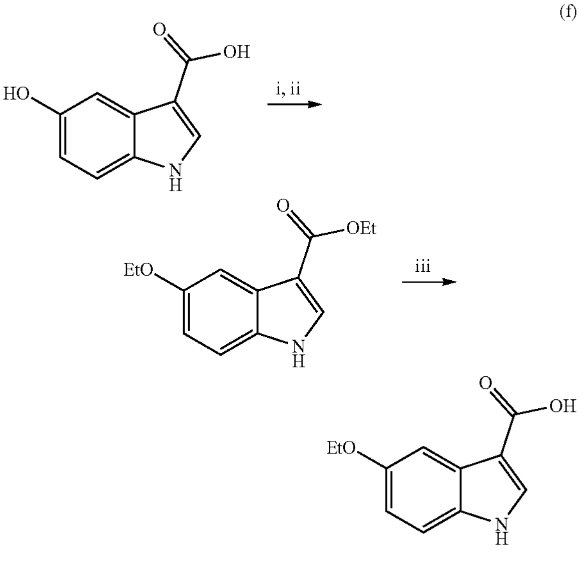

Scheme 10 shows methods for the synthesis of various mono-substituted 1H-indole-3-carboxylic acids that are not commercially available, in which: (a)(i) $CBr_4$, $PPh_3$, DCM, 0° C. (Tetrahedron Lett. 2011, 52:1815-1818); (a)(ii) $Cs_2CO_2$, DMSO, 120° C. (Tetrahedron Lett. 2011, 52:1815-1818); (b)(i) $POCl_3$, DMF, 0° C. to 40° C. (US2017/0066717); (b)(ii) NaOH, MeOH/THF, 80° C. (the isomers 4-(trifluoromethyl)-1H-indole, 6-(trifluoromethyl)-1H-indole and 7-(trifluoromethyl) indole are also available as starting materials for this sequence) (EP 1990335); (c)(i) $NEt_3$, THF, 0° C. (J. Org. Chem. 2014, 79:2105-2110); (c)(ii) 200° C. (J. Org. Chem. 2014, 79:2105-2110); (c)(iii) $PhNH_2$, $Pd_2(dba)_3$, $NaHCO_3$, pivalic acid, DMA, 120° C. (CN104892485); (c)(iv) NaOH, MeOH/THF, 80° C.; (d)(i) $H_2SO_4$, MeOH, reflux; (d)(ii) Pd/C, $H_2$, MeOH; (d)(iii) NaOH, MeOH/THF, 80° C.; (e)(i) $H_2SO_4$, MeOH, reflux (Chem. Pap. 2018, 72:1369-1378); (e)(ii) $K((CH{=}CH_2)(BF_3))$, $PdCl_2$, $PPh_3$, $Cs_2CO_3$, $THF/H_2O$, heat; (e)(iii) Pd/C, $H_2$, MeOH, r.t.; (e)(iv) NaOH, MeOH/THF, 80° C. Alternative substitution patterns can be accessed using differently substituted bromo-indoles; $C_3$ and $C_4$ alkyl isomers can be incorporated in an analogous fashion using the appropriate commercially available organotrifluoroborate or organoboronic acid or ester); (f)(i) $H_2SO_4$, EtOH, reflux; (f)(ii) EtI, $K_2CO_3$, acetone, heat; (f)(iii) KOH, EtOH, heat (alternative substitution patterns could be accessed by using differently substituted hydroxy-indoles; other $C_1$-$C_4$ moieties can be incorporated using the appropriate commercially available alkyl iodide or alkyl bromide.

Scheme 11

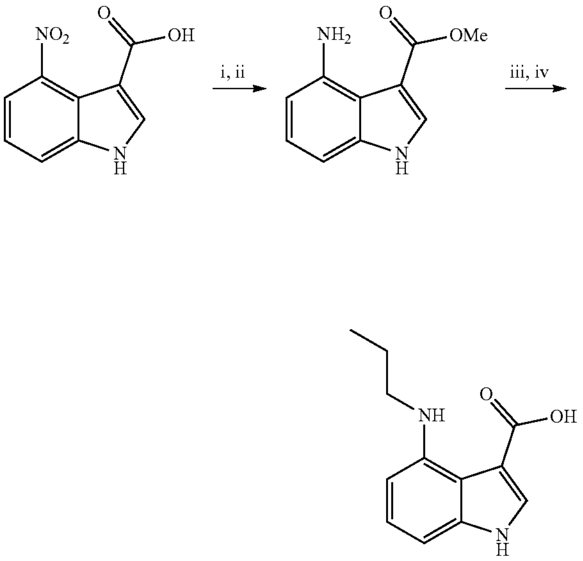

Scheme 11 shows a general method for the preparation of N-alkyl-substituted indoles (5- and 6-nitro-1H-indole-3-carboxylic acid are also commercially available and can be used as starting materials in this sequence; other alkyl groups can be incorporated using the appropriate aldehyde or ketone), in which: (i) $H_2SO_4$, MeOH, reflux; (ii) Pd/C, $H_2$, MeOH, r.t. (Bioorg. Med. Chem. Lett. 2011, 21: 1782-1785); (iii) $H_3CCH_2CHO$, Pd/C, $H_2$, MeOH, r.t.; (iv) NaOH, MeOH/THF, 80° C.

Scheme 12

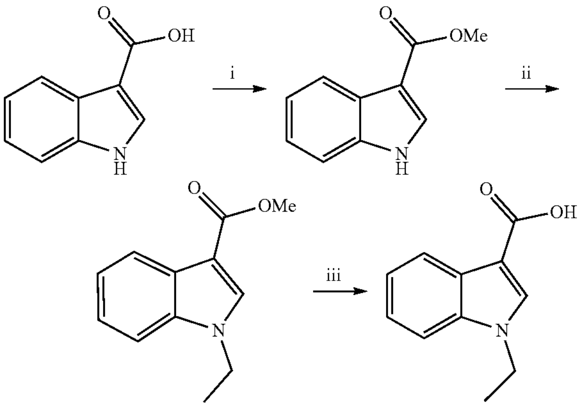

Scheme 12 shows a general method for the preparation of N-alkylated indoles. (i) $H_2SO_4$, MeOH, reflux (Org. Biomol. Chem. 2012, 10:6885-6892); (ii) NaH, THF, then EtI, 70° C. (WO 2008/087529) (iii) NaOH, THF/MeOH (Bioorg. Med. Chem. Lett. 2005, 15:2734-2737). Other $C_1$-$C_4$ moieties can be incorporated using the appropriate commercially available alkyl iodide or alkyl bromide.

Scheme 13

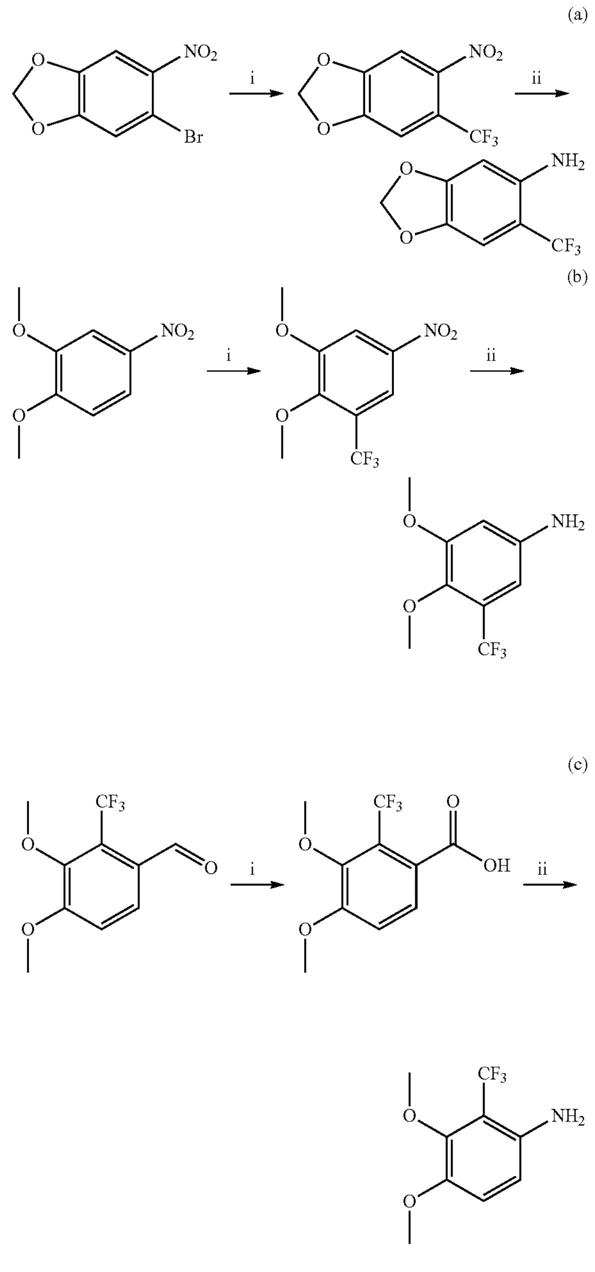

Scheme 13 shows methods for the synthesis of trifluoromethyl-substituted anilines that are not commercially available (some that are not represented here only vary in the substituents on O: these substitutions can be achieved by applying the general methods shown in Scheme 20 at an appropriate stage in the synthesis), in which: (a)(i) $F_2ClCCO_2Me$, KF, CuI, DMF, heat; (a)(ii) $SnCl_2 \cdot 2H_2O$, EtOH, reflux; (b)(i) $F_3CCOOH$, $XeF_2$, DCM, r.t. (J. Org. Chem. 1988, 53, 4582-4585) (b)(ii) $SnCl_2 \cdot 2H_2O$, EtOH, reflux; (c)(i) $NaClO_2$, sulfamide, MeOH, $H_2O$, 0° C. (EP2557082); (ii) DPPA, $NEt_3$, benzene, reflux, then LiOH, $THF/H_2O$, r.t.

Scheme 14

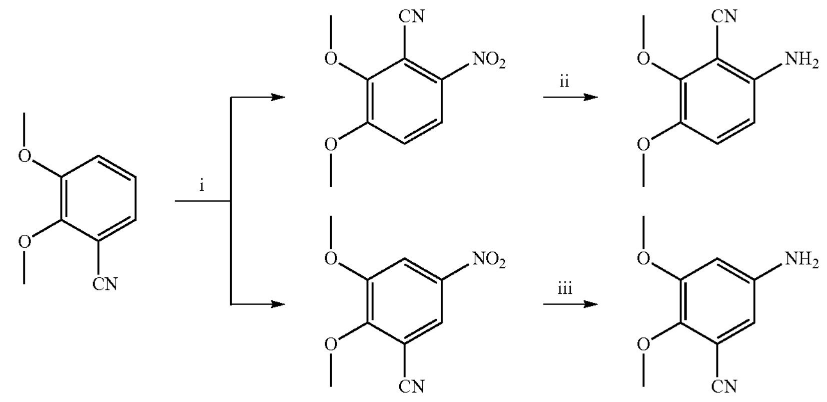

Scheme 14 shows methods for the synthesis of cyano-substituted anilines that are not commercially available (2,3-dihydro-benzo[1,4]dioxin-5-carbonitrile is also commercially available and can be used as a starting material in this sequence; conversion to the corresponding dioxolanes can be achieved by applying the general methods shown in Scheme 20 at an appropriate stage in the synthesis), in which: (i) trifluoromethylsulfonic anhydride, $Me_4N(NO_3)$, DCM (J. Org. Chem. 2003, 68, 267-275); (ii) Fe, $H_3CCOOH$, iPrOH, heat (J. Heterocycl. Chem. 1986, 23:1821-1828); (iii) Fe, HCl, EtOH, reflux (WO 2018/232094).

Scheme 15

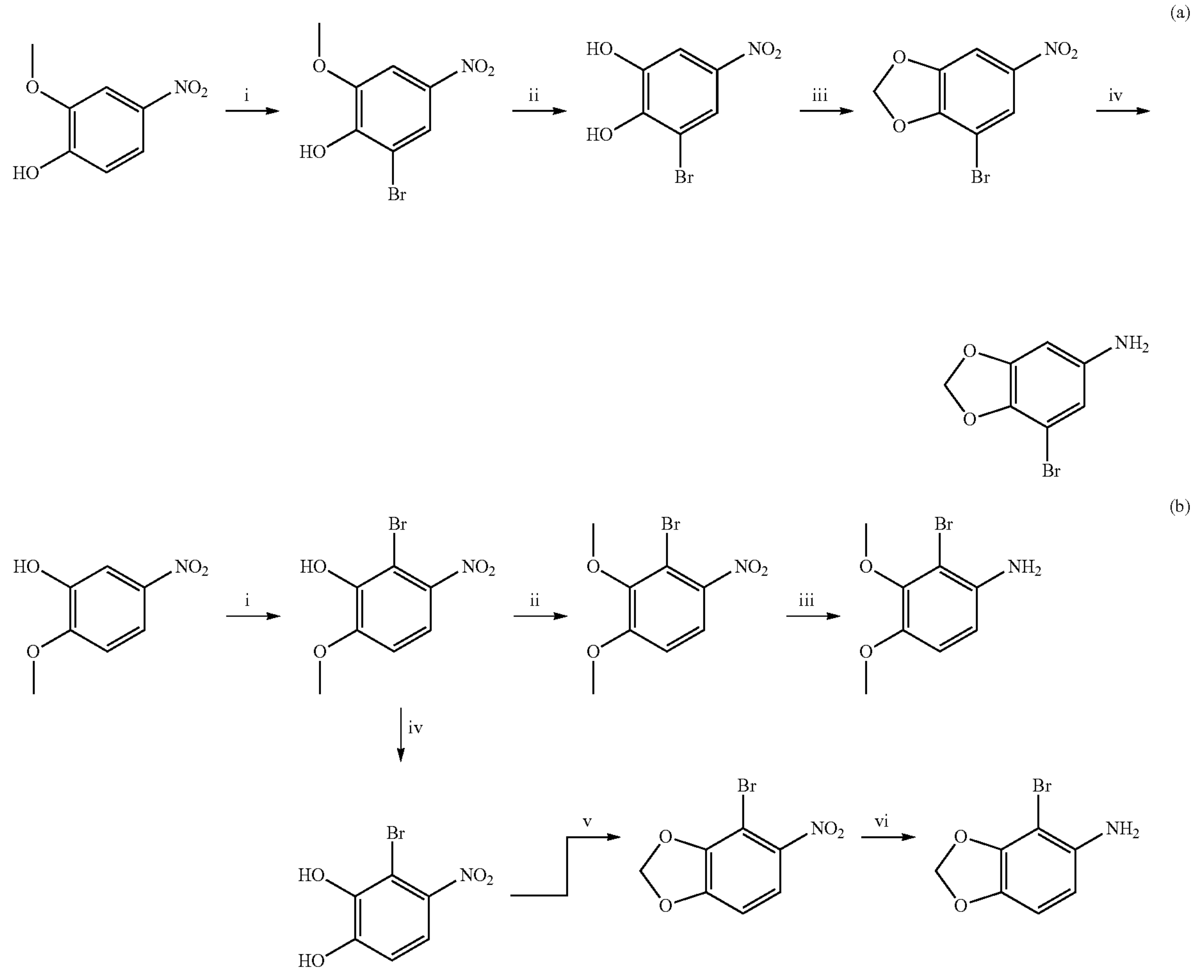

-continued (c)

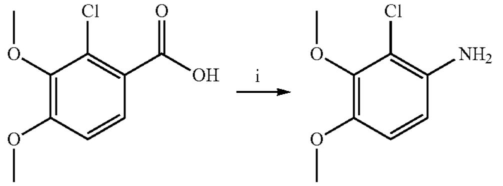

(d)

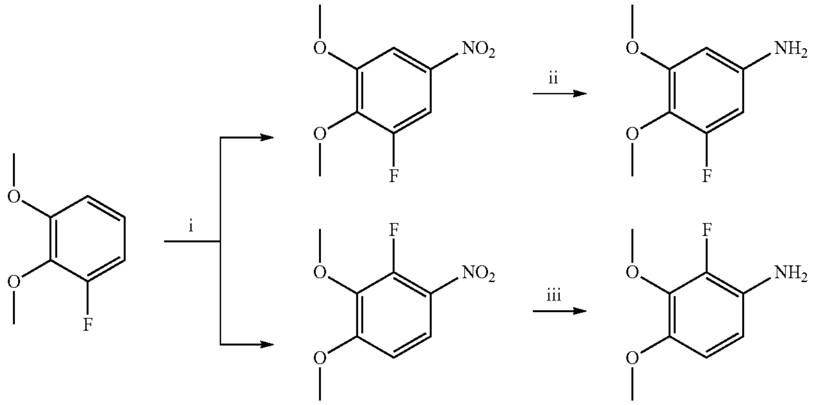

Scheme 15 shows methods for the synthesis of halo-substituted anilines that are not commercially available (some that are not represented here only vary in the substituents on O: these substitutions can be achieved by applying the general methods shown in Scheme 20 at an appropriate stage in the synthesis), in which: (a)(i) $Br_2$, $H_3CCOOH$, r.t. (WO 2011/025798); (a)(ii) $BBr_3$, DCM;) a)(iii) $CH_2I_2$, $K_2CO_3$, DMF, heat; (a)(iv) Pd/C, $H_2$, EtOH; (b)(i) $Br_2$, $H_3CCOOH$ (Tetrahedron Lett. 2008, 49, 5309-5311); (b)(ii) dimethyl sulfate, $K_2CO_3$ (Tetrahedron Lett. 2008, 49:5309-5311); (b)(iii) Pd/C, $H_2$, EtOH; (b)(iv) $BBr_3$, DCM; (b)(v) $CH_{212}$, $K_2CO_3$, DMF, heat; (b)(vi) Pd/C, $H_2$, EtOH; (c)(i) DPPA, $NEt_3$, PhMe, reflux, then 9-fluorenemethanol, reflux, then piperidine, r.t.; (d)(i) $HNO_3$, 0-20° C. (WO 2013/052568); (d)(ii) Pd/C, $H_2$, EtOH; (d)(iii) $PtO_2$, $H_2$, EtOH (WO 2013/052568).

Scheme 16

(a)

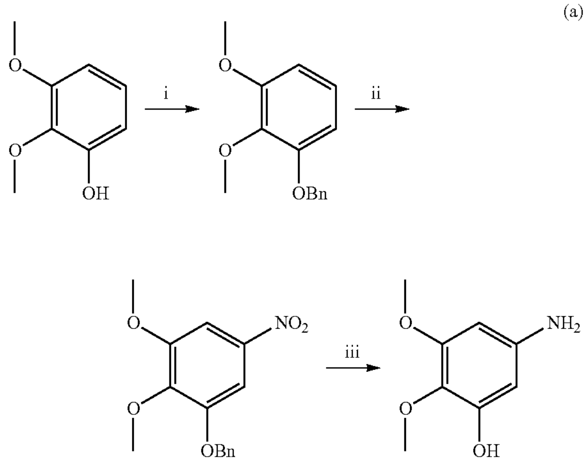

-continued (b)

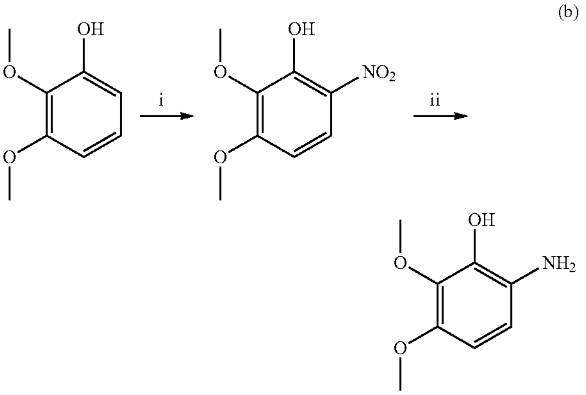

(c)

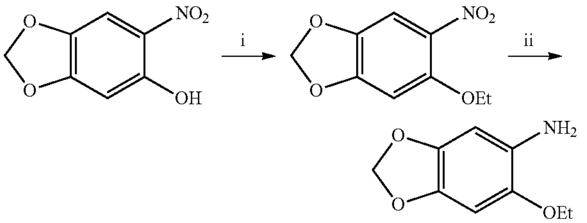

(d)

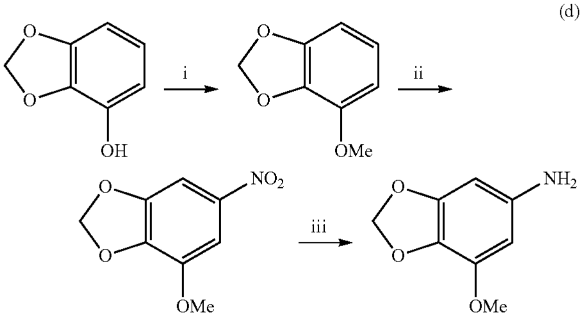

-continued (e)

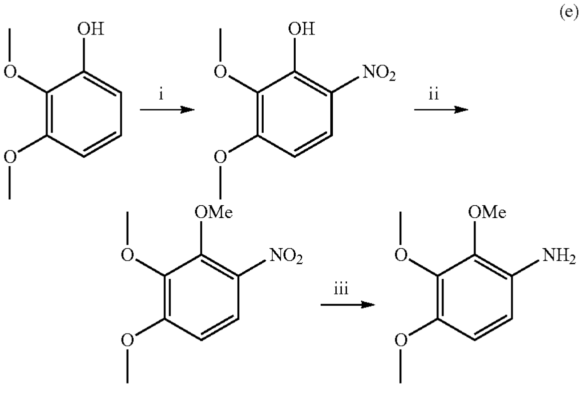

Scheme 16 shows methods for the synthesis of hydroxy- and alkoxy-substituted anilines that are not commercially available (2H-benzo[d][1,3]dioxolan-4-ol and 2,3-dihydro-1,4-benzodioxin-5-ol are also commercially available and could be used as starting materials for sequences a, b and e; 4,5-dimethoxy-2-nitro-phenol and 7-nitro-2,3-dihydro-benzo[1,4]dioxin-6-ol are also commercially available and could be used as a starting material in sequence d; 2,3-dimethoxyphenol and 2,3-dihydro-1,4-benzodioxin-5-ol could also be used as starting materials in sequence e; other $C_1$-$C_4$ moieties could be incorporated using the appropriate commercially available alkyl iodide or alkyl bromide). In this scheme: (a)(i) BnBr, $K_2CO_3$, MeCN, reflux (Chem.: Eur. J. 2016, 22:15058-15068); (a)(ii) $HNO_3$, $(CH_3CO)_2O$, r.t.; (a)(iii) Pd/C, $H_2$ (20 psi), EtOH, r.t. (U.S. Pat. No. 6,048,866); (b)(i) $HNO_3$, $H_2O$, $H_3CCOOH$, 5° C. (U.S. Pat. No. 6,337,420); (b)(ii) Pd/C, $H_2$, MeOH; (c)(i) EtI, $K_2CO_3$, DMF, r.t.; (c)(ii) Pd/C, $H_2$, MeOH; (d)(i) MeI, $K_2CO_3$, acetone; (d)(ii) $HNO_3$, $(H_3CCO)_2O$, r.t. (WO 2004/046120); (d)(iii) Pd/C, $H_2$, MeOH; (e)(i) $HNO_3$, $H_2O$, $H_3CCOOH$, 5° C. (U.S. Pat. No. 6,337,420); (e)(ii) dimethyl sulfate, $K_2CO_3$, xylene (J. Chem. Soc. 1931, 2542-2549); (e)(iii) Sn, HCl (J. Chem. Soc. 1931, 2542-2549).

Scheme 17

(a)

(b)

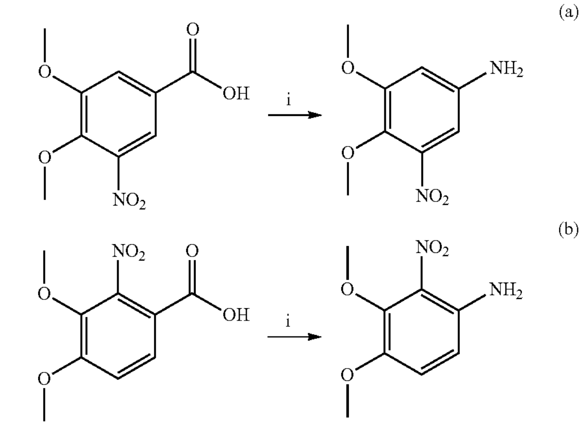

Scheme 17 shows methods for the synthesis of nitro-substituted anilines that are not commercially available (some that are not represented here only vary in the substituents on O: these substitutions can be achieved by applying the general methods shown in Scheme 20 at an appropriate stage in the synthesis), in which: (a)(i) DPPA, $NEt_3$, PhMe, reflux, then 9-fluorenemethanol, reflux, then piperidine, r.t.; (b)(i) $SOCl_2$, DMF, 1,2-DCE, heat, then $NaN_3$, acetone/$H_2O$, 5° C., then $H_3CCOOH/H_2O$, heat (J. Med. Chem. 1999, 42:2373-2382).

Scheme 18

(a)

(b)

(c)

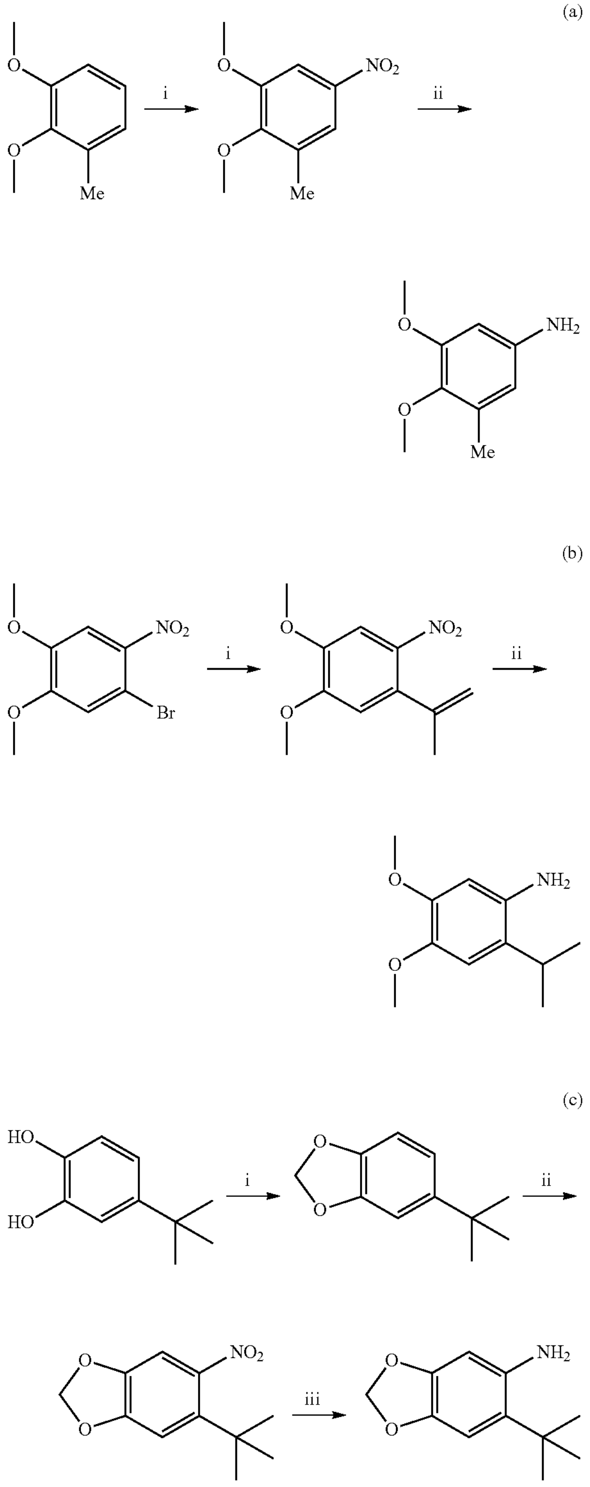

-continued (d)

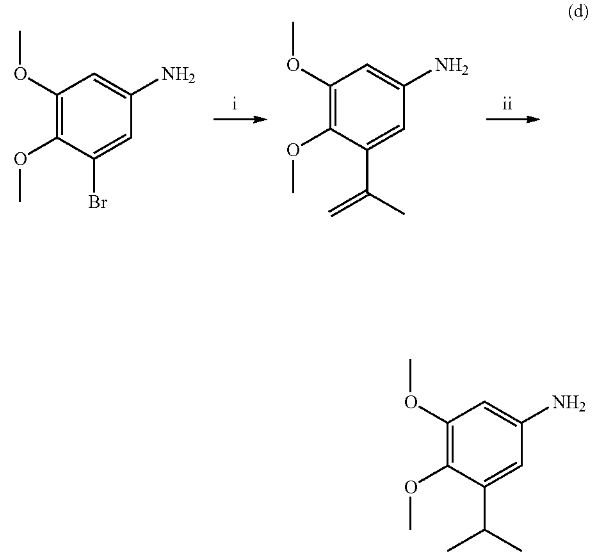

(e)

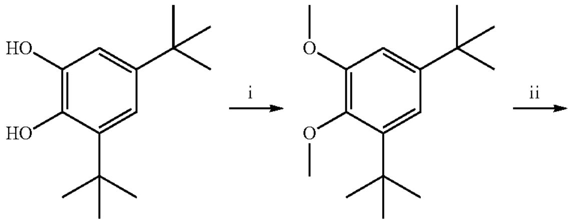

-continued

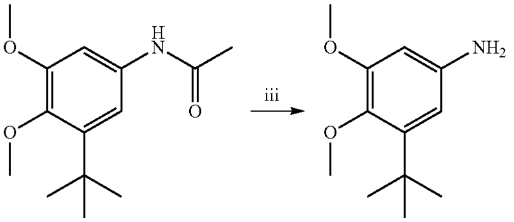

Scheme 18 shows methods for the synthesis of C-alkylated-anilines that are not commercially available (some that are not represented here only vary in the substituents on O: these substitutions can be achieved by applying the general methods shown in Scheme 20 at an appropriate stage in the synthesis; other $C_2$-$C_4$ alkyl isomers could be incorporated in an analogous fashion using the appropriate commercially available organotrifluoroborate or organoboronic acid or ester). In this scheme: (a)(i) $HNO_3$, −10° C. (Tetrahedron 1985, 41:2355-2359); (a)(ii) Pd/C, $H_2$, MeOH, <586 Torr, r.t. (Tetrahedron 1985, 41:2355-2359); (b)(i) isopropenylboronic acid pinacol ester, Pd(dppf)$Cl_2$, $NaHCO_3$, 1,4-dioxane/$H_2O$, 100° C. (WO 2017/160569); (b)(ii) Pd/C, $H_2$ (50 psi), MeOH (WO 2017/160569); (c)(i) NaOH, DMSO/$H_2O$, 90° C., then $CH_{2/2}$ (US 2008/0234314); (c)(ii) $HNO_3$, $(H_3CCO)_2O$, −10° C. (US 2008/0234314): (c)(iii) Fe, HCl, EtOH/$H_2O$, reflux (US 2008/0234314); (d)(i) isopropenylboronic acid pinacol ester, Pd(dppf)$Cl_2$, $NaHCO_3$, 1,4-dioxane/$H_2O$, 100° C.; (d)(ii) Pd/C, $H_2$ (50 psi), MeOH; (e)(i) NaH, then MeI (Czech. Chem. Commun. 2000, 65:924-940); (e)(ii) MeCN, $nBu_4NClO_4$ (Czech. Chem. Commun. 2000, 65:924-940); (e)(iii) NaOH, EtOH/$H_2O$, heat.

Scheme 19

(a)

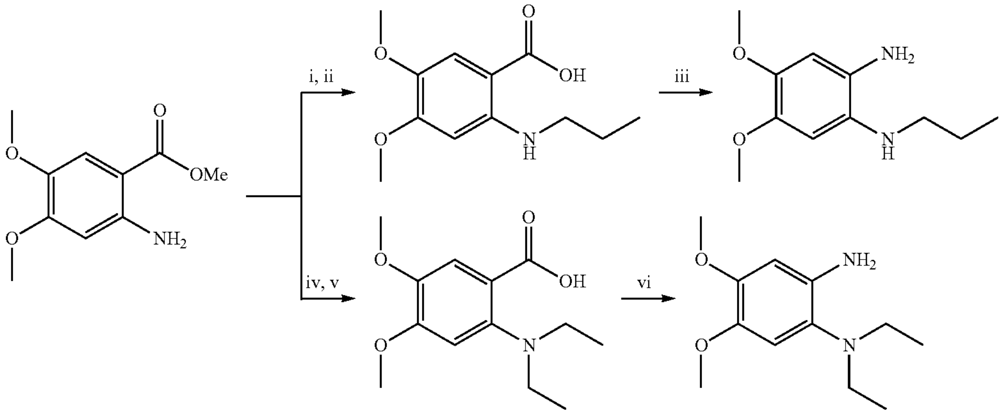

-continued (b)

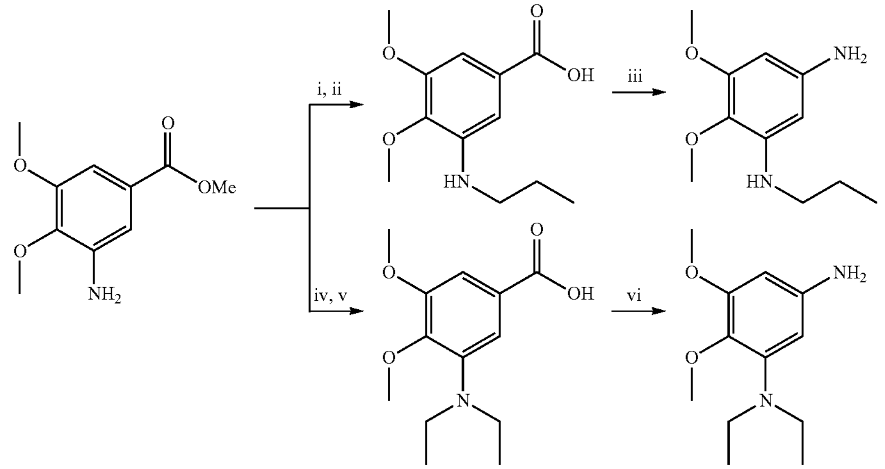

(c)

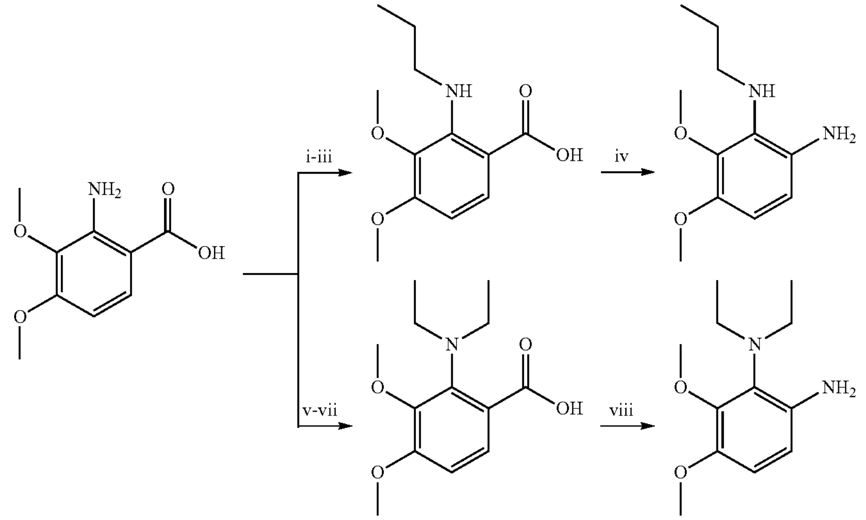

Scheme 19 shows methods for the synthesis of N-substituted anilines that are not commercially available (some that are not represented here only vary in the substituents on O: these substitutions can be achieved by applying the general methods shown in Scheme 20 at an appropriate stage in the synthesis; other alkyl groups could be incorporated using the appropriate aldehyde, ketone, or alkyl halide). In this scheme: (a) and (b)(i) $H_3CCH_2CHO$, Pd/C, $H_2$, MeOH, r.t.; (ii) NaOH, MeOH/THF, 80° C.; (iii) DPPA, $NEt_3$, PhMe, reflux, then 9-fluorenemethanol, reflux, then piperidine, r.t.; (iv) EtBr, NaOH, PhH, heat; (v) NaOH, MeOH/THF, 80° C.; (vi) DPPA, $NEt_3$, PhMe, reflux, then 9-fluorenemethanol, reflux, then piperidine, r.t.; (c)(i) HCl, $MeOH/H_2O$ (U.S. Pat. No. 4,287,341); (c)(ii) $H_3CCH_2CHO$, Pd/C, $H_2$, MeOH, r.t.; (c)(iii) NaOH, MeOH/THF, 80° C.; (c)(iv) DPPA, $NEt_3$, PhMe, reflux, then 9-fluorenemethanol, reflux, then piperidine, r.t.; (c)(v) HCl, $MeOH/H_2O$ (U.S. Pat. No. 4,287,341); (c)(vi) EtBr, NaOH, PhH, heat; (c)(vii) NaOH, MeOH/THF, 80° C.; (c)(viii) DPPA, $NEt_3$, PhMe, reflux, then 9-fluorenemethanol, reflux, then piperidine, r.t. Compounds with $NH_2$, rather than being alkylated, can be accessed by reduction of the corresponding $NO_2$ at an appropriate stage in the synthesis, using example procedures described herein.

Scheme 20

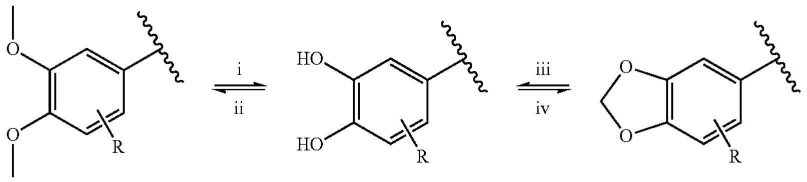

Scheme 20 shows general methods for interconversion of substituents on the 1,2-dihydroxybenzene moiety, in which: (i) $BBr_3$, DCM; (ii) dimethyl sulfate, $K_2CO_3$, acetone, heating; (iii) $BBr_3$, DCM; (iv) $CH_2Br_2$, $K_2CO_3$, DMF, heat.

The compounds described herein have useful properties in increasing the motility of sperm. In one aspect, the invention provides the use of a compound of formula (I), a stereoisomer, or physiologically tolerable salt thereof to enhance the motility of sperm obtained from a non-human mammal.

Sperm cells display different patterns of movement that are adapted to their functional needs in space and time. These movements can be monitored, for example, by a Computer Assisted Sperm Analyzer (CASA), which records and analyses the movement of the sperm head. Factors like average path velocity (VAP), curvilinear velocity (VCL), straightness (STR), linearity (LIN) and amplitude of lateral head displacement (ALH) have all been shown to be directly correlated to semen quality. "Sperm motility" is defined herein as the percentage of moving sperm and can be sub-divided into progressive motility, non-progressive motility and immotility (i.e. no movement). In semen, sperm cells mostly exhibit a fast forward motion (known as "progressive motility") which is necessary for the cells to travel through the cervix. "Non-progressive motility" refers to all other patterns of motility with the absence of progression. The complex process of sperm capacitation (the penultimate step in the maturation of mammalian spermatozoa which is required to render them competent to fertilize an egg) starts once the cells have entered the uterus. Hyperactivation or "hyperactive motility" is a hallmark of capacitation and this motile behavior is observed as a vigorous and asymmetrical swimming pattern that aids the release of spermatozoa from the oviduct epithelium and subsequent penetration of the egg cell. Since sperm motility affects the ability of sperm to move properly through the female reproductive tract (in vivo) or through water (in vitro) to reach the egg, it is a factor in successful fertilization. In mammals, sperm motility also facilitates the passing of the sperm through the cumulus oophorus and the zona pellucida which surround the mammalian oocyte.

The compounds herein described have a general sperm motility enhancing effect when contacted with mature mammalian sperm cells, i.e. they function as "sperm activators". In particular, they are capable of increasing the progressive motility of sperm. In view of these properties, the compounds are suitable for use in enhancing the fertilization of an egg in vivo or in vitro and may therefore be used in fertility procedures.

Any reference herein to "enhancing sperm motility" is intended to mean increasing sperm motility compared to the motility of sperm from a control mammal (or from the same mammal) which has not been contacted with a compound as herein described. Any reference herein to the use of a compound or composition "to enhance sperm motility" is to be construed accordingly.

In some embodiments, the compounds herein described are capable of increasing all forms of sperm motility. In some embodiments, the compounds may be capable of increasing both progressive and hyperactive motility. In some embodiments, they may be capable of increasing progressive motility. In boar, progressive sperm may, for example, be defined as those cells demonstrating an average path velocity (VAP) of greater than 45 μm/s and a straightness (STR) of greater than 45%. Hyperactive motility in boar sperm may, for example, be defined according to the parameters discussed in Schmidt and Kamp (Induced Hyperactivity in Boar Spermatozoa and its Evaluation by Computer-Assisted Sperm Analysis, Reproduction, 128:171-179, 2004). In particular, hyperactive sperm in boar may be defined as those cells demonstrating a curvilinear velocity (VCL) of greater than 97 μm/s and a linearity (LIN) of less than 32%, along with a mean lateral head displacement ($LHD_{mean}$) of greater than 3.5 μm and a wobble (WOB) of less than 71%.

In some embodiments, the compounds herein described are capable of increasing the proportion of progressive and/or hyperactive mature sperm cells in a sperm sample from a non-human mammal by up to 20%, e.g. up to 15%, e.g. by 10-15%.

In another aspect the invention provides a method of enhancing the motility of sperm obtained from a non-human mammal, said method comprising the step of contacting said sperm with an effective amount of a compound of formula (I) as herein described, or a stereoisomer or physiologically tolerable salt thereof in vitro. Optionally, this method may additionally comprise the step of obtaining or collecting semen from said mammal. Such methods are well known in the breeding of livestock and other animals.

As used herein, the term "effective amount" is intended to mean a sperm motility-enhancing concentration. The concentration required to achieve the desired activity will depend on various factors, such as the particular compound and its intended use and may be varied or adjusted as required. Typically, the concentration required may be in the range from 50 to 100 μM, e.g. 55 to 95 μM, 60 to 90 μM, 70 to 85 μM, or 75 to 80 μM.

In view of their ability to increase sperm motility, for example to increase progressive sperm motility, the compounds herein described find particular use in methods of artificial insemination.

For use in accordance with the invention, the compounds herein described are contacted with mature sperm cells whereby to increase their motility. For example, they may be mixed with a semen sample taken from a non-human mammal. In any of the uses or methods herein described, the compounds will typically be formulated as a composition which can be added to the sperm (e.g. a sample of semen) in order to enhance sperm motility. Such compositions may comprise the active compound of formula (I), a stereoisomer or a physiologically acceptable salt thereof, in combination with one or more physiologically tolerable carriers, excipients or diluents. Such compositions form a further aspect of the invention. Acceptable carriers, excipients and diluents for this purpose are well known in the art and can readily be selected. Examples include solvents, solubilizing agents, preserving agents (e.g. antioxidants), semen extenders, buffers (e.g. TRIS-(tris(hydroxymethyl)aminomethane)), pH modifiers (e.g. citric acid), viscosity modifiers, stabilizing agents, and tonicity adjusting agents. Suitable carriers may include, for example, DMSO, water, phosphate buffer and saline.

In one embodiment, the compounds for use in the invention may be formulated as a liquid composition which, when mixed with a semen sample, is suitable for vaginal administration. For example, the compounds may be dissolved or dispersed in a suitable solvent. Suitable solvents may be readily selected by those skilled in the art having in mind the need for these to be physiologically tolerable.

The term "physiologically tolerable" as used herein in relation to any compound or composition means that the compound or composition is chemically and/or toxicologically compatible with other components of the formulation or with the subject to whom it is to be administered.

As used herein, the term "semen extender" (or "extender") refers to any component or combination of components capable of maintaining the viability of a semen sample, i.e. which preserves its fertilization ability. It acts to protect sperm cells from their own toxic by-products whilst also protecting the sperm cells from cold shock and osmotic shock during chilling and/or during transport. Chilling of sperm reduces its metabolism and so aids in its storage. Components generally known for use as semen extenders include, for example, egg yolk, milk proteins, membrane protecting agents, proteins, sugars, antioxidants, antibiotics (e.g. ticarcillin, timentin, amikacin sulfate, penicillin, gentamicin, tylosin, spectinomycin, lincomycin, streptomycin, or combinations thereof, or other antibiotics according to EU Directive 88/407), phospholipids, glycerol, buffers (e.g. TRIS), citric acid, and combinations thereof. Commercially available semen extenders for use in pigs include AndroMed® (which contains phospholipids, TRIS, citric acid, sugars, antioxidants, buffers, glycerol, water and antibiotics), Triladyl®, Triladyl® CCS and Biladyl® (all of which contain TRIS, citric acid, sugar, buffers, glycerol, water and antibiotics according to EU Directive 88/407 (e.g. tylosin, gentamicin, spectinomycin, and lincomycin)).

The compositions according to the invention may be prepared using conventional techniques, such as dissolution and/or mixing procedures.

In one embodiment, an activator compound or composition containing such a compound as herein described may be added to a semen sample prior to cryopreservation. Cryogenic preservation of sperm allows for the longer term storage of sperm, for example when this needs to be transported for use, or when this will be used at a later date. When used in this way, the cryogenic composition may additionally include freezing extenders (also generally referred to as "cryoprotectants" or "cryopreservation adjuvants") which help to protect the sperm during the freezing and subsequent thawing processes. Typical cryoprotectants include, for example, glycerol, mannitol, sucrose, trehalose, DMSO and dimethylformamide (DMF).

In one embodiment, an activator compound or composition containing such a compound as herein described may be added to a fresh semen sample. Alternatively, this may be added to a cryopreserved semen sample once thawed.

For use in artificial insemination, the compounds and compositions may be used in pre-treating or preparing sperm for use in such a procedure. For example, sperm intended for use in the artificial insemination procedure may be contacted (i.e. "pre-treated") with said compound or said composition in vitro prior to vaginal administration to a mammalian female. Contact may comprise incubation with said compound or said composition. Incubation times may vary but may range from about 15 to 45 mins, for example about 15 to 20 minutes prior to use. Following incubation, the treated sperm sample is "ready for use". By pre-treating sperm intended for use in such a procedure, it may be possible to increase fertilization rates and/or increase the number of offspring.

In another aspect, the invention thus provides a method of treating or preparing sperm for use in an artificial insemination procedure, said method comprising the following steps:

(a) providing a sperm sample from a mammalian male subject; and
(b) contacting said sperm sample with a compound or composition as herein described.

The sperm sample may be a fresh sperm sample or it may be a sperm sample that has been cryopreserved and thawed. Treated sperm obtained or obtainable by such a method also forms an aspect of the invention.

In another aspect, the invention provides a method of artificial insemination of a non-human mammalian female, said method comprising the step of inseminating said female with treated sperm as described herein. As will be understood, the female will be fertile.

For use in artificial insemination, a fixed volume of semen may be combined with a single dose of a composition containing the activator compound as herein described, and gently agitated (e.g. inverted carefully) to ensure adequate mixing to form an "activated" dose of semen. This can then be used to inseminate the female using methods conventional in the art. A typical fixed volume of semen may range from about 70 to 100 mL, e.g. 80 to 95 mL, preferably about 90 mL. A single dose of the composition may, for example, contain from 20 to 100 μL, preferably 30 to 80 μL, e.g. about 50 μL, of a 100 mM solution of the activator compound.

Non-human mammalian subjects which may be treated in accordance with the invention include, in particular, farm animals (e.g. sheep, cows, pigs, etc.), but may also include domestic animals (e.g. dogs, cats, etc.) and laboratory animals (e.g. mice, rats, monkeys, etc.). Especially preferred mammals are pigs. Other mammals that may benefit from the invention include horses (e.g. race horses) and endangered species of animals.

EXAMPLES

The invention will now be described in more detail by way of the following non-limiting Examples and with reference to the accompanying figures which show:

FIG. 1: A: % Activation of boar sperm in the presence of Compound No. 1; and B: Motility and progressive motility of boar sperm in the presence of Compound No. 1.

Figure 2:
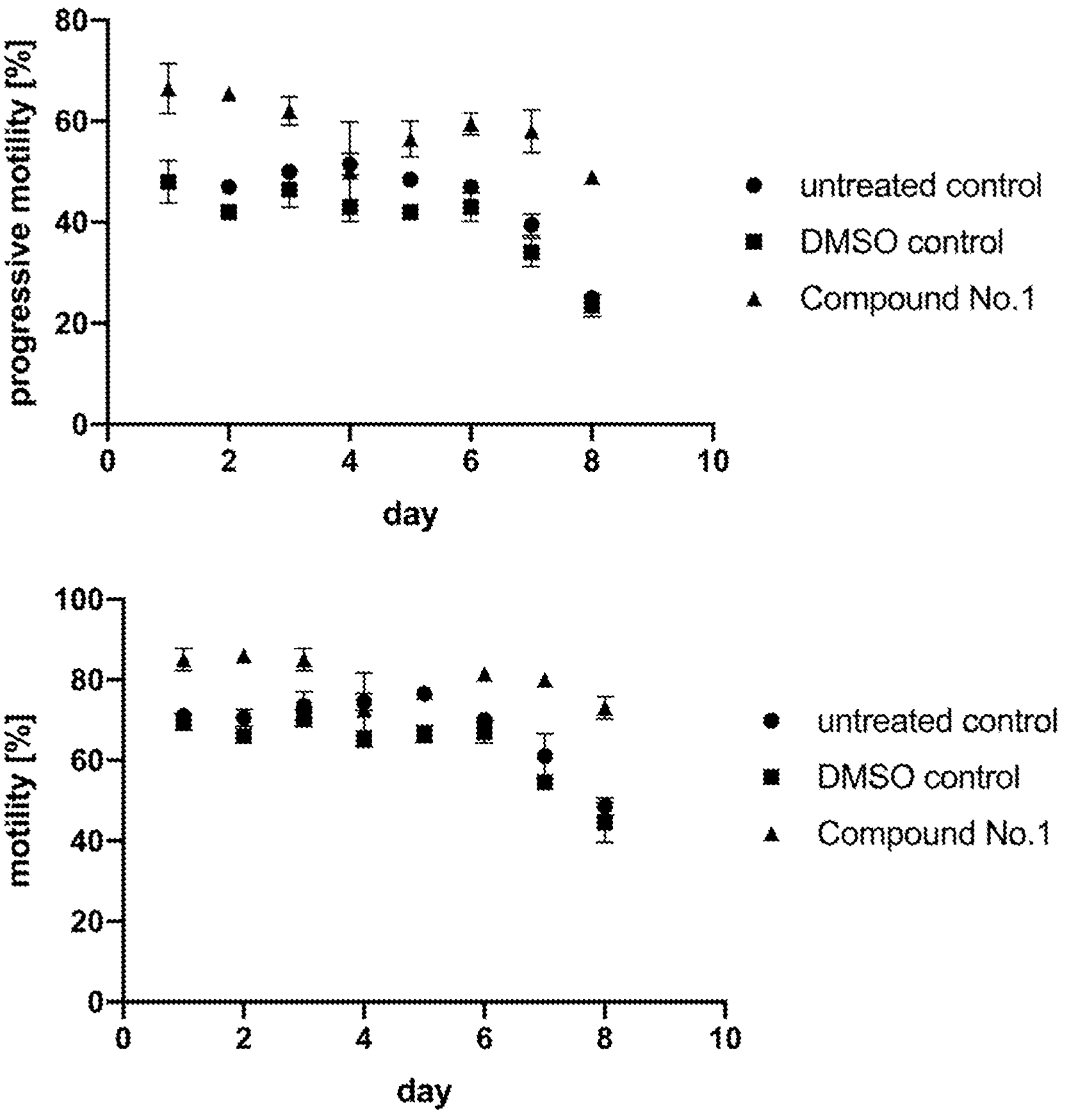

FIG. 2: Progressive motility and motility of boar sperm following the addition of Compound No. 1 to a sperm sample stored at 18° C. for 1 to 8 days.

Figure 3:
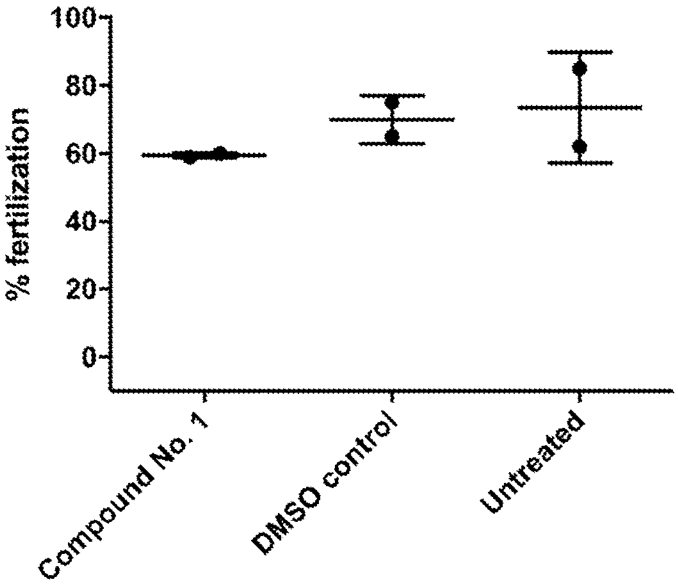

FIG. 3: In vitro fertility rates (% fertilization) in mice oocytes contacted with mice sperm cells incubated in the presence of Compound No. 1.

Figure 4:
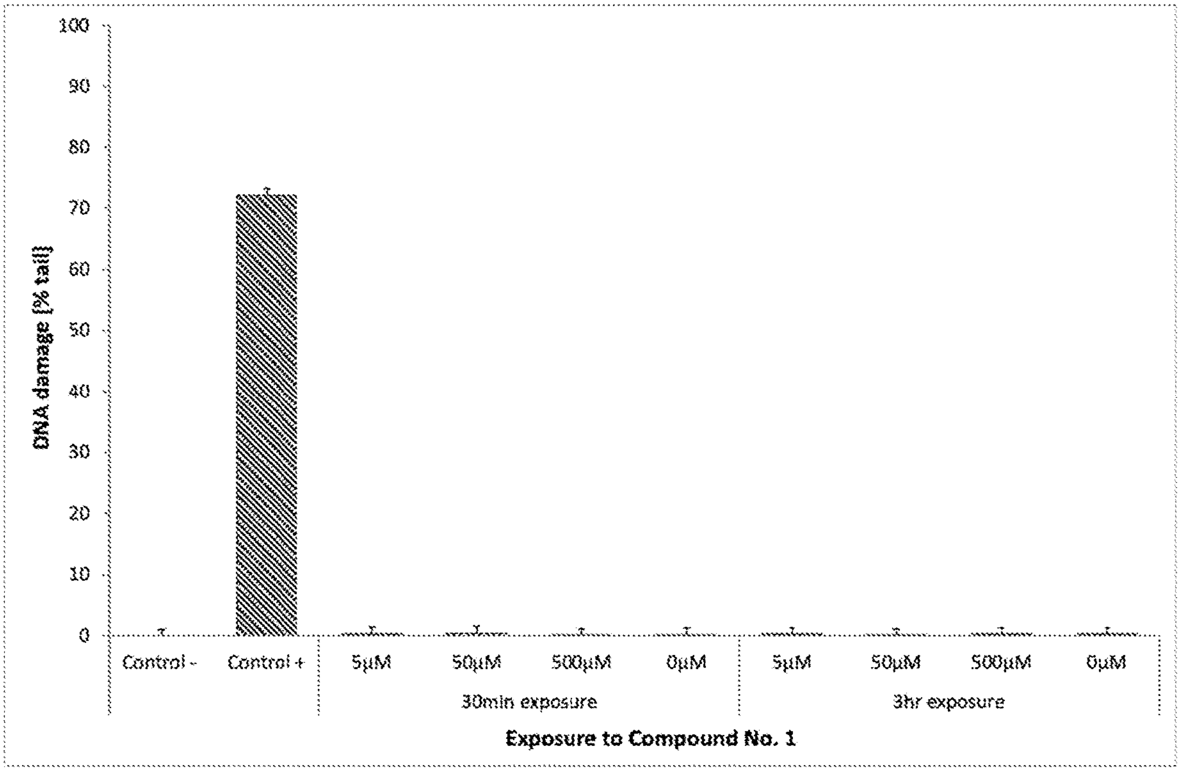

FIG. 4: Genotoxicity of different concentrations of Compound No. 1 against human T-cells.

Figure 5:
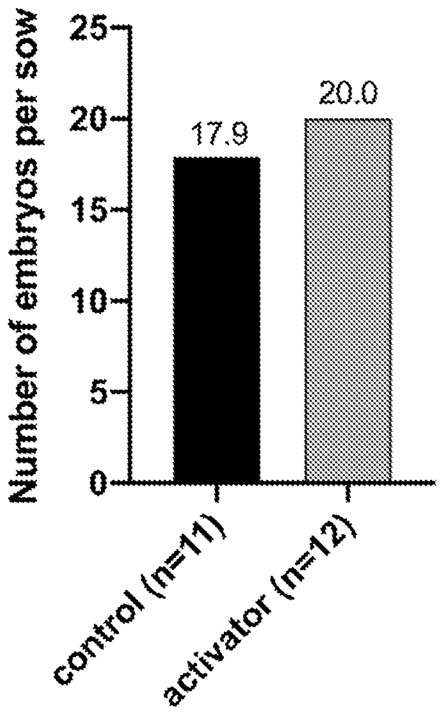

FIG. 5: Average number of embryos per sow following artificial insemination with untreated "control" boar sperm and boar sperm incubated with Compound No. 1 ("activator").

Example 1—Determination of Sperm Motility and Progressive Motility

Method

Duroc boar sperm samples were received from Norsvin AS and contained pooled semen from three individual boars. Semen samples were stored in Androstar® extender (minitube) at 18° C. prior to use. Compound No. 1 was tested in duplicates, using 2-fold serial dilutions including 10 individual concentrations starting from 100 μM. 995 μL semen were aliquoted in Eppendorf tubes and 5 μL of Compound No. 1 diluted in DMSO were added leading to the described final concentrations. The resulting semen samples were mixed gently and incubated for 12 min at 37° C. in a water bath. Subsequently, 10 μL of each semen sample was added to a counting chamber slide (Leja) and incubated on a plate incubator at 37° C. Sperm motility, progressive motility and curvilinear velocity were determined using a CASA (Hamilton Thorne), starting from 14 min. For each chamber A and B 15 individual frames were analysed and motility as well as progressive motility data was read out. The data were converted into activation-% using DMSO-only controls (set to 100% activity) by determining the percental increase of either motility or progressive motility relative to the control sample without added Compound No. 1. For the determination of $EC_{50}$ values, data were fitted using Prism8 (non-linear fit, absolute $IC_{50}$, x is concentration, graphpad.com).

Results

Figure 1B:
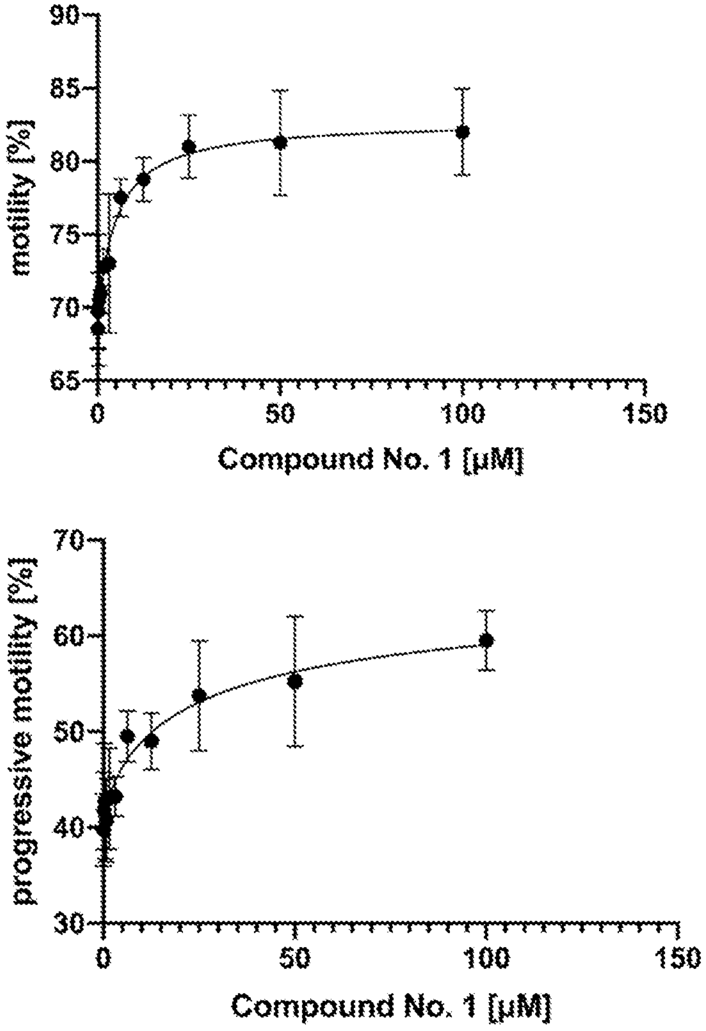

Activation ("activation-%") of boar sperm in the presence of Compound No. 1 is shown in FIG. 1A for the different concentrations tested (n=6). The respective curve fits for the determination of $EC_{50}$ values are shown for motility and progressive motility. Absolute $EC_{50}$ motility: 3.31 M; absolute $EC_{50}$ progressive motility: 11.17 μM. As shown in FIG. 1B, Compound No. 1 increases both motility and progressive motility in a dose-dependent manner (n=4).

Example 2—Effect of Long-Term Storage—Boar Sperm

Method

The effect of Compound No. 1 ("activator") on the shelf-life of boar sperm was evaluated. Compound No. 1 was freshly added to stored boar sperm aliquots.

The sperm samples were stored as aliquots in Eppendorf tubes (995 μl) at 18° C. During the course of one week 5 μl 10 mM activator solution in DMSO (50 μM final concentration) was added to one aliquot and the resulting solution was incubated in a water bath at for 12 min at 37° C. Subsequently, 10 μl semen samples were taken out and added to a counting chamber slide, incubated for 2 min at 37° C. and analysed as described in Example 1.

Results

Motility and progressive motility for the stored sperm samples after the addition of Compound No. 1 are shown in FIG. 2. The results show that the addition of the activator solution to the stored boar sperm sample increases motility and progressive motility, even after 7 days of storage and therefore has a positive impact on boar sperm shelf life.

Example 3—In Vitro Fertilization—Mouse

Method

In vitro fertilization (IVF) studies were conducted to determine whether the activator compound No. 1 has any adverse effects on the fertilization process. Male mice were sacrificed, and the epididymis was opened to release the sperm into the appropriate buffer in a petri dish. The sperm cells were incubated with 50 μM of the activator compound for one hour before an aliquot was transferred to a petri dish containing oocytes. The cells were further incubated at 37° C. and 1-cell/2-cell eggs were counted after 24 hours. The experiment was performed in duplicates using sperm from the same epididymis and oocytes from two different mice.

Results

Sperm treated with Compound No. 1 showed fertility rates comparable to the control samples. The results are within the normal fertilization rate of mouse IVF ranging from 50 to 80% (see FIG. 3). Compound No. 1 therefore does not interfere with the fertilization process.

Example 4—Genotoxicity

Method

Human T-cells (four concentrations of Compound No. 1 including 0 μM; two exposure times) were embedded in 1% agarose, lysed in cold 2.5 M NaCl, 0.1 M EDTA, 10 mM Tris buffer, and 1% Triton X-100, pH 10. Incubation with dithiothreitol and lithium diiodosalicylate was followed by incubation in cold 0.3M NaOH, and 1 mM EDTA for 20 min and then electrophoresis at 0.8 V/cm for 20 min in a cold room. After neutralization with PBS, and staining with SYBRGold (Invitrogen), slides were scored using the Comet Assay IV image analysis programme (Perceptive Instruments).

Results

The results are summarised in Table 1 and graphically represented in FIG. 4. No genotoxic effects of the activator were observed.

TABLE 1

| | Treatment | % Tail DNA |
|---|---|---|
| Control− | Lysis | 0.1 |
| Control+ | $H_2O_2$ | 75.4 |
| 0.5 hr exposure | 500 μM | 0.4 |
| | 50 μM | 0.6 |
| | 5 μM | 0.2 |
| | 0 μM | 0.1 |
| 3 hr exposure | 5 μM | 0.5 |
| | 50 μM | 0.1 |
| | 500 μM | 0.2 |
| | 0 μM | 0.0 |

Example 5—Field Trial Pilot Study—Insemination of Sows for Life-Stock Breeding

Method

A pilot field study included 27 sows of which 13 received untreated control sperm and 14 received sperm treated with Compound No. 1 ("activator"). Insemination doses were collected from the same animals during the course of the experiment and contained pooled semen from three individual boars. 45 μl 100 mM activator solution in DMSO was added to 89 ml boar sperm (final concentration of 50 μM) directly before insemination which was carried out within 15 to 45 min. The sperm was transferred to an insemination bottle and then the activator was added. After placing the insemination catheter into the cervix of the sow, the bottle was connected, and the sperm sample was released into the sow. The sows received insemination doses on two subsequent days. After 30 to 35 days the animals were sacrificed, the uteri were removed and embryos were counted for all 30 sows. Organ material from 5 activator-receiving sows and 5 sows from the control group were optically inspected and samples from the uterus, cervix and vagina were formalin-fixated for histology examination. The organ material from both the control group and the activator group showed mostly normal mucosa and no signs of lesions in the cervix, uteri and vaginae. The formalin preparations were cut and stained with hematoxylin eosin for histological examination. The histopathological assessment included a thorough evaluation of the epithelium of the mucosa and the underlying lamina propria. In both the epithelium and lamina propria, particular emphasis was placed on acute changes. In the epithelium, the acute changes included single cell necrosis/apoptosis and infiltration of polymorphonuclear leukocytes. In the lamina propria, infiltration of polymorphonuclear leukocytes was considered as the most important acute change. Three of the five sows in the activator group and one sow in the control group showed abundant infiltration of polymorphonuclear leukocytes mostly in the cervix and uterus. Necrosis/apoptosis was detected in one of the sows of the control group and one of the sows in the activator-receiving group.

Infiltration of lymphocytes in the epithelium and lamina propria was considered to be within the normal range of all individuals. Flattening and possibly loss of surface epithelium were partly difficult to assess. Edema and bleeding in the lamina propria were detected in several individuals. Heat and age are the denominators of leukocyte infiltration in sows and are considered normal.

The average number of embryos was determined for the sows of the control group (n=11, 11 sows were in pig after insemination) and the activator-receiving group (n=13, 13 sows in pig after insemination). Not only did the activator increase pregnancy rates in the sows, but it also led to an average increase of 2 embryos per sows (see FIG. 5).

Example 6—Field Trial Study

Following the success of the pilot study reported in Example 5, a larger field trial study was conducting which included 441 sows. 224 sows received untreated control sperm and 217 received sperm treated with Compound No. 1 ("activator"). Results from this larger study revealed a 5% increase in pregnancy rate and an average increase of ~1 more live piglet born per sow for the sows which received sperm treated with the activator compound. By improving the pregnancy rate and number of piglets born per sow, use of the sperm activator improved the weaning to service interval ("WSI"), i.e. the interval between consecutive pregnancies.

The invention claimed is:

1. A method of enhancing the motility of sperm obtained from a non-human mammal, said method comprising the step of contacting said sperm with an effective amount of a compound of formula (I), a stereoisomer, or a physiologically tolerable salt thereof:

(I)

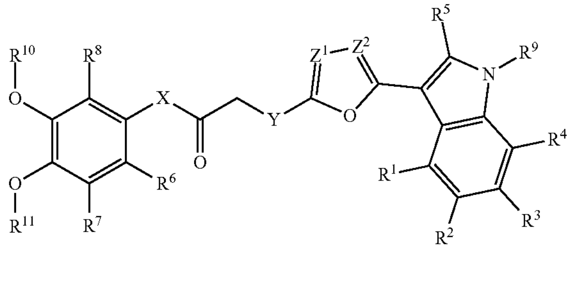

wherein:

X is —NR'—, —O—, —S— or —$CH_2$—;

wherein R', when present, is H or $C_{1-3}$ alkyl;

Y is —S—, —O—, —NR"—, or —$CH_2$—;

wherein R", when present, is H or $C_{1-3}$ alkyl;

$Z^1$ and $Z^2$ are independently selected from N and CH;

$R^1$ to $R^3$ are independently selected from hydrogen, halogen, $C_{1-6}$ alkyl, $C_{1-6}$ alkoxy, $C_{1-6}$ haloalkyl, —OH, —CN, —$NO_2$ and —$NR^{12}R^{13}$;

$R^4$ is hydrogen, halogen, $C_{1-6}$ alkyl, $C_{1-6}$ alkoxy, $C_{1-6}$ haloalkyl, or —OH;

$R^5$ is hydrogen, halogen, $C_{1-6}$ alkyl, $C_{1-6}$ alkoxy, or $C_{1-6}$ haloalkyl;

$R^6$ and $R^7$ are independently selected from hydrogen, halogen, $C_{1-6}$ alkyl, $C_{1-6}$ alkoxy, $C_{1-6}$ haloalkyl, —OH, —CN, —$NO_2$ and —$NR^{12}R^{13}$;

$R^8$ is hydrogen, halogen, $C_{1-6}$ alkyl, $C_{1-6}$ alkoxy, $C_{1-6}$ haloalkyl, —CN, —$NO_2$ or —$NR^{12}R^{13}$;

$R^9$ is hydrogen or $C_{1-4}$ alkyl;

$R^{10}$ and $R^{11}$ are independently selected from hydrogen and $C_{1-3}$ alkyl;

or $R^{10}$ and $R^{11}$, together with the intervening —O— and ring atoms, are joined to form a dioxolane ring; and $R^{12}$ and $R^{13}$, when present, are independently selected from H and $C_{1-3}$ alkyl.

2. The method of claim 1, wherein:

X is —NR' or —O—; and

R', when present, is H or —$CH_3$.

3. The method of claim 1, wherein:

Y is selected from —S—, —O—, —NR"—, and —$CH_2$; and

R", when present, is H or —$CH_3$.

4. The method of claim 1, wherein said compound is a compound of formula (II), or a stereoisomer or physiologically tolerable salt thereof:

(II)

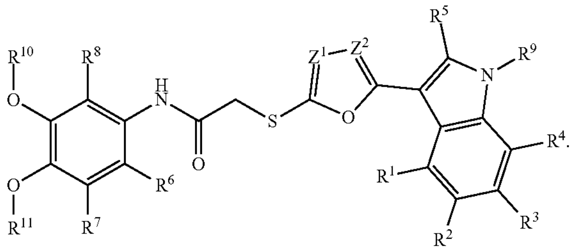

5. The method of claim 1, wherein both $Z^1$ and $Z^2$ are N, or one of $Z^1$ and $Z^2$ is N and the other of $Z^1$ and $Z^2$ is CH.

6. The method of claim 1, wherein both $Z^1$ and $Z^2$ are N.

7. The method of claim 1, wherein said compound is a compound of formula (III), or a stereoisomer or physiologically tolerable salt thereof:

(III)

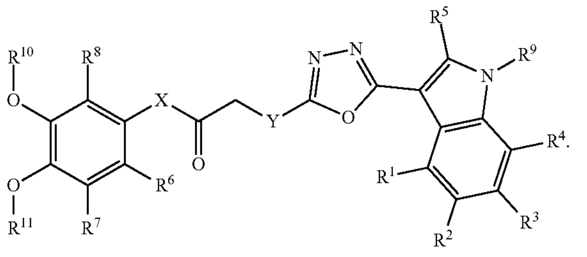

8. The method of claim 1, wherein $R^1$ to $R^3$ are independently selected from hydrogen, halogen, $C_{1-4}$ alkyl, and $C_{1-4}$ haloalkyl.

9. The method of claim 1, wherein $R^4$ is hydrogen, halogen, $C_{1-4}$ alkyl, or $C_{1-4}$ haloalkyl.

10. The method of claim 1, wherein $R^5$ is hydrogen, halogen, $C_{1-4}$ alkyl, or $C_{1-4}$ haloalkyl.

11. The method of claim 1, wherein $R^6$ and $R^7$ are independently selected from hydrogen, halogen, $C_{1-4}$ alkyl, and $C_{1-4}$ haloalkyl.

12. The method of claim 1, wherein $R^8$ is hydrogen, halogen, $C_{1-4}$ alkyl, or $C_{1-4}$ haloalkyl.

13. The method of claim 1, wherein $R^9$ is hydrogen or $—CH_3$.

14. The method of claim 1, wherein $R^{10}$ and $R^{11}$ are independently selected from hydrogen and $C_{1-3}$ alkyl.

15. The method of claim 1, wherein $R^{10}$ and $R^{11}$, together with the intervening —O— and ring atoms, are joined to form a dioxolane ring.

16. The method of claim 1, wherein said compound is a compound of formula (IV), or a stereoisomer or physiologically tolerable salt thereof:

(IV)

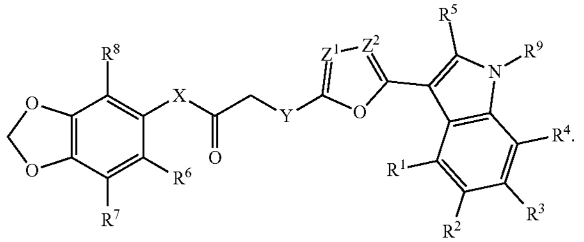

17. The method of claim 1, wherein the compound is the following compound:

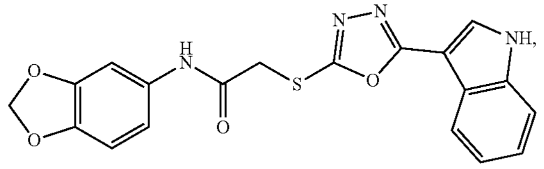

or a stereoisomer, or physiologically tolerable salt thereof.

18. The method of claim 1, wherein the contacting said sperm with an effective amount of a compound enhances progressive sperm motility.

19. A method of treating or preparing sperm for use in an artificial insemination procedure, said method comprising:

(a) providing a sperm sample from a non-human mammalian male subject; and (b) contacting said sperm sample with the compound according to claim 1 optionally in combination with one or more physiologically tolerable carriers, excipients or diluents selected from the group consisting of sugars, antibiotics, proteins, membrane protecting agents, antioxidants, phospholipids, glycerol, citric acid, solvents, and buffers.

20. The method as claimed in claim 19, wherein the compound is the following compound:

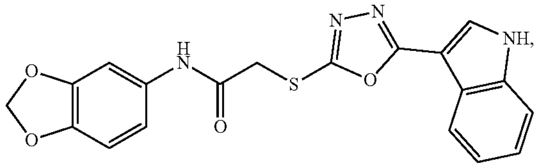 [SMILES: O=C(CSc1nnc(-c2c[nH]c3ccccc23)o1)Nc1ccc2c(c1)OCO2]

or a stereoisomer, or physiologically tolerable salt thereof.

21. A method of artificial insemination, said method comprising:

(a) providing a sperm sample from a non-human mammalian male subject;

(b) contacting said sperm sample with the compound according to claim 1 optionally in combination with one or more physiologically tolerable carriers, excipients or diluents selected from the group consisting of sugars, antibiotics, proteins, membrane protecting agents, antioxidants, phospholipids, glycerol, citric acid, solvents, and buffers; and (c) introducing the sperm sample contacted with said compound into the vaginal tract of a non-human mammalian female subject.

22. The method as claimed in claim 21, wherein the sperm sample is from a ram, bull or boar.

23. The method as claimed in claim 21, wherein the compound is the following compound:

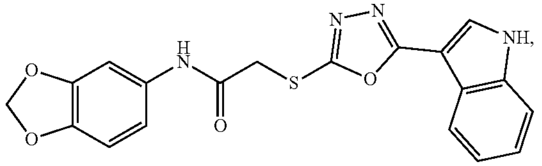

or a stereoisomer, or physiologically tolerable salt thereof.

24. A method of enhancing the motility of sperm obtained from a non-human mammal, said method comprising the step of adding to said sperm a composition comprising:

a compound of formula (I), a stereoisomer, or a physiologically tolerable salt thereof:

(I)

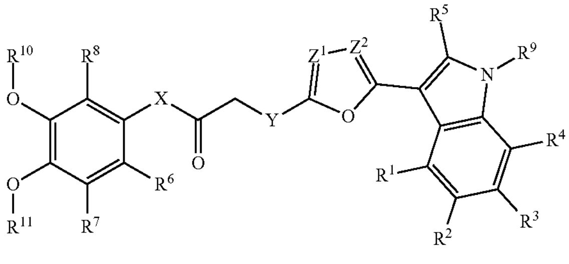

wherein:

X is $—NR'—$, —O—, —S— or $—CH_2—$;

R', when present, is H or $C_{1-3}$ alkyl;

Y is —S—, —O—, $—NR''—$, or $—CH_2—$;

R'', when present, is H or $C_{1-3}$ alkyl;

$Z^1$ and $Z^2$ are independently selected from N and CH;

$R^1$ to $R^3$ are independently selected from hydrogen, halogen, $C_{1-6}$ alkyl, $C_{1-6}$ alkoxy, $C_{1-6}$ haloalkyl, —OH, —CN, —$NO_2$ and —$NR^{12}R^{13}$;

$R^4$ is hydrogen, halogen, $C_{1-6}$ alkyl, $C_{1-6}$ alkoxy, $C_{1-6}$ haloalkyl, or —OH;

$R^5$ is hydrogen, halogen, $C_{1-6}$ alkyl, $C_{1-6}$ alkoxy, or $C_{1-6}$ haloalkyl;

$R^6$ and $R^7$ are independently selected from hydrogen, halogen, $C_{1-6}$ alkyl, $C_{1-6}$ alkoxy, $C_{1-6}$ haloalkyl, —OH, —CN, —$NO_2$ and —$NR^{12}R^{13}$;

$R^8$ is hydrogen, halogen, $C_{1-6}$ alkyl, $C_{1-6}$ alkoxy, $C_{1-6}$ haloalkyl, —CN, —$NO_2$ or —$NR^{12}R^{13}$;

$R^9$ is hydrogen or $C_{1-4}$ alkyl;

$R^{10}$ and $R^{11}$ are independently selected from hydrogen and $C_{1-3}$ alkyl;

or $R^{10}$ and $R^{11}$, together with the intervening —O— and ring atoms, are joined to form a dioxolane ring; and $R^{12}$ and $R^{13}$, when present, are independently selected from H and $C_{1-3}$ alkyl; and one or more physiologically tolerable carriers, excipients or diluents selected from the group consisting of sugars, antibiotics, proteins, membrane protecting agents, antioxidants, phospholipids, glycerol, citric acid, solvents, and buffers.

* * * * *